US012501468B2

(12) United States Patent
Xu et al.

(10) Patent No.: US 12,501,468 B2
(45) Date of Patent: Dec. 16, 2025

(54) MANAGING DOWNLINK TRAFFIC RECEPTION AND CROSS-LINK INTERFERENCE

(71) Applicant: QUALCOMM Incorporated, San Diego, CA (US)

(72) Inventors: Huilin Xu, Temecula, CA (US); Qunfeng He, San Diego, CA (US); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 18/261,993

(22) PCT Filed: Mar. 31, 2021

(86) PCT No.: PCT/CN2021/084353

§ 371 (c)(1),
(2) Date: Jul. 18, 2023

(87) PCT Pub. No.: WO2022/205051

PCT Pub. Date: Oct. 6, 2022

(65) Prior Publication Data

US 2023/0403732 A1 Dec. 14, 2023

(51) Int. Cl.

*H04L 1/00* (2006.01)
*H04W 72/0446* (2023.01)
*H04W 72/1273* (2023.01)
*H04W 72/23* (2023.01)
*H04W 72/541* (2023.01)

(52) U.S. Cl.

CPC ..... *H04W 72/541* (2023.01); *H04W 72/0446* (2013.01); *H04W 72/1273* (2013.01); *H04W 72/23* (2023.01)

(58) Field of Classification Search

CPC ............... H04W 72/541; H04W 72/23; H04W 72/0446; H04W 72/0173

See application file for complete search history.

(56) References Cited

U.S. PATENT DOCUMENTS 12,389,409 B2 * 8/2025 Zhang ........................ H04L 5/14
2018/0323916 A1 11/2018 Yang et al.

(Continued)

FOREIGN PATENT DOCUMENTS

CN 109219970 A 1/2019

OTHER PUBLICATIONS

International Search Report and Written Opinion—PCT/CN2021/084353—ISA/EPO—Dec. 31, 2021. 9 pages.

(Continued)

*Primary Examiner* — Abdelnabi O Musa

(74) *Attorney, Agent, or Firm* — Paul M. McAdams; Dinsmore & Shohl LLP

(57) ABSTRACT

In methods and devices configured to perform the methods for managing downlink traffic reception and cross-link interference (CLI), a wireless device may receive from a base station physical downlink control channel (PDCCH) traffic using a first receive (Rx) resource tuning of an Rx resource, determine whether a time period between an end of the PDCCH traffic and a beginning of a CLI measurement opportunity exceeds a threshold duration for tuning the Rx resource to a second Rx resource tuning, and may receive downlink traffic using the first Rx resource tuning in response to determining that the time period between the end of the PDCCH traffic and the beginning of the CLI measurement opportunity is less than or equal to the threshold duration.

28 Claims, 13 Drawing Sheets

(56) References Cited

U.S. PATENT DOCUMENTS

| | | | | |
|---|---|---|---|---|
| 2021/0067991 | A1* | 3/2021 | Zhu | H04L 5/0051 |
| 2022/0159662 | A1* | 5/2022 | Li | H04L 5/0051 |
| 2023/0199853 | A1* | 6/2023 | Zhang | H04W 74/0833 370/277 |
| 2023/0247459 | A1* | 8/2023 | Ma | H04B 17/318 370/329 |
| 2024/0007892 | A1* | 1/2024 | Li | H04B 17/336 |
| 2024/0163701 | A1* | 5/2024 | Xu | H04W 24/10 |

OTHER PUBLICATIONS

RAN4: "Reply LS on CLI Measurement Capability", 3GPP TSG-RAN WG4 Meeting #94-e, R4-2002221, Online, Feb. 24-Mar. 6, 2020, Mar. 6, 2020(Mar. 6, 2020) the whole document, 1 Page.

Zte, et al., "Discussion on UE Feature for CLI", 3GPP TSG RAN WG1#101, R1-2003491, e-Meeting, May 25-Jun. 5, 2020, Jun. 4, 2020 (Jun. 4, 2020) the whole document, 3 Pages.

Moderator (LG Electronics): "Email discussion summary for [95e][207] NR_CLI_RIM_RRM", 3GPP TSG-RAN WG4 Meeting # 95-e, R4-2008496, 3rd Generation Partnership Project, Mobile Competence Centre, 650, Route Des Lucioles, F-06921, Sophia-Antipolis Cedex, France, vol. RAN WG4, No. Electronic Meeting, May 25, 2020-Jun. 5, 2020, Jun. 9, 2020, 7 Pages, XP051895249, Section 2.

NEC: "Scheduling Restriction For CLI Measurement", 3GPP TSG-RAN WG4 Meeting #92, R4-1908801, 3rd Generation Partnership Project, Mobile Competence Centre, 650, Route Des Lucioles, F-06921, Sophia-Antipolis Cedex, France, vol. RAN WG4, No. Ljubljana, Slovenia, Aug. 26, 2019-Aug. 30, 2019, Aug. 16, 2019, 4 Pages.

Supplementary European Search Report—EP21933728—Search Authority—Munich—Nov. 13, 2024.

* cited by examiner

MANAGING DOWNLINK TRAFFIC RECEPTION AND CROSS-LINK INTERFERENCE

RELATED APPLICATIONS

This application claims priority as a U.S. National Stage application to PCT Application No. CN2021/084353 entitled "Managing Downlink Traffic Reception And Cross-Link Interference" filed Mar. 31, 2021, the entire contents of which are incorporated herein by reference for all purposes.

BACKGROUND

Cross-link interference (CLI) may occur when a first wireless device (sometimes referred to as an "aggressor") transmits uplink signals at the same time that a nearby second wireless device (sometimes referred to as a "victim") attempts to receive downlink signals, if the first wireless device's uplink signal symbols collide with at least one downlink signal symbol of the second wireless device. CLI may occur between wireless devices communicating in the same cell or in different cells. A base station may schedule resources for a victim wireless device to measure the CLI from an aggressor wireless device and provide a report about the measured CLI to the base station. Typically the aggressor wireless device does not transmit a special signal to facilitate measurement of CLI, and the aggressor wireless device is typically unaware that its uplink transmissions are measured by the victim wireless device.

SUMMARY

Various aspects include methods performed by wireless devices configured to perform the methods for managing downlink traffic reception and cross-link interference. Various aspects may include receiving from a base station physical downlink control channel (PDCCH) traffic using a first receive (Rx) resource tuning of an Rx resource, determining whether a time period between an end of the PDCCH traffic and a beginning of a CLI measurement opportunity exceeds a threshold duration for tuning the Rx resource to a second Rx resource tuning, and receiving downlink traffic using the first Rx resource tuning in response to determining that the time period between the end of the PDCCH traffic and the beginning of the CLI measurement opportunity is less than or equal to the threshold duration.

In some aspects, the downlink traffic may include physical downlink shared channel (PDSCH) traffic or a channel state information reference signal (CSI-RS). Some aspects may include determining whether the CLI measurement opportunity overlaps with downlink traffic in response to determining that the time period between the end of the PDCCH traffic and the beginning of the CLI measurement opportunity exceeds the threshold duration, and receiving the downlink traffic using the first Rx resource tuning in response to determining that the CLI measurement opportunity overlaps with the downlink traffic. Some aspects may include performing a CLI measurement using the second Rx resource tuning during the CLI measurement opportunity in response to determining that the CLI measurement opportunity does not overlap with the downlink traffic. Some aspects may include performing a CLI measurement using the second Rx resource tuning during a later CLI measurement opportunity that does not conflict with later downlink traffic.

In some aspects, receiving the downlink traffic using the first Rx resource tuning in response to determining that the time period between the end of the PDCCH traffic and the beginning of the next CLI measurement opportunity is less than or equal to the threshold duration may include beginning a measurement of the CLI using the second Rx resource tuning, determining based on decoded PDCCH traffic whether a second time period from the end of the PDCCH traffic to a beginning of the downlink traffic exceeds a second threshold duration, and receiving the downlink traffic using the first Rx resource tuning before completing the measurement of the CLI in response to determining that the second time period from the end of the PDCCH traffic to the beginning of the downlink traffic is less than or equal to the second threshold duration. Some aspects may include completing the measurement of the CLI using the second Rx resource tuning in response to determining that the second time period from the end of the PDCCH traffic to the beginning of the downlink traffic exceeds the second threshold duration.

Further aspects include a wireless device having a processor configured to perform one or more operations of any of the methods summarized above. Further aspects include processing devices for use in a wireless device configured with processor-executable instructions to perform operations of any of the methods summarized above. Further aspects include a non-transitory processor-readable storage medium having stored thereon processor-executable instructions configured to cause a processor of a wireless device to perform operations of any of the methods summarized above. Further aspects include a wireless device having means for performing functions of any of the methods summarized above.

Various aspects include methods performed by base stations configured to perform the methods for managing downlink traffic reception and cross-link interference. Various aspects may include receiving from a wireless device a capability report indicating whether the wireless device is configured to determine whether a time period between an end of physical downlink control channel (PDCCH) traffic and a beginning of a cross-link interference (CLI) measurement opportunity exceeds a threshold duration, and scheduling for the wireless device downlink traffic that does not overlap with the CLI measurement opportunity in response to determining that the wireless device is not configured to determine whether the time period between the end of the PDCCH traffic and the beginning of the CLI measurement opportunity exceeds the threshold duration.

In some aspects, the capability report may indicate whether the wireless device is configured to determine whether to switch to the second Rx resource and perform a CLI measurement by determining whether a time period between the end of the PDCCH traffic and the beginning of the CLI measurement opportunity exceeds the threshold duration. In some aspects, the downlink traffic may include physical downlink shared channel (PDSCH) traffic or a channel state information reference signal (CSI-RS). Some aspects may include scheduling the PDCCH traffic and the CLI measurement opportunity at least the threshold duration apart in response to determining that the wireless device is configured to determine whether the time period between the end of the PDCCH traffic and the CLI measurement opportunity exceeds the threshold duration.

In some aspects, the capability report indicates whether the wireless device is configured to determine whether a second time period from the end of the PDCCH traffic to a beginning of the downlink traffic is less than or equal to a second threshold duration. Such aspects may further include scheduling the downlink traffic at least the second threshold duration after the end of the PDCCH traffic in response to determining that the wireless device is configured to determine whether the second time period from the end of the PDCCH traffic to the beginning of the downlink traffic is less than or equal to the second threshold duration.

Some aspects may further include scheduling downlink traffic so as to not overlap with the CLI measurement opportunity in response to determining that the wireless device is not configured to determine whether the second time period from the end of the PDCCH traffic to the beginning of the downlink traffic is less than or equal to the second threshold duration. In some aspects, the capability report may indicate whether the wireless device is configured to abort a CLI measurement in response to determining that a second time period from the end of the PDCCH traffic to the beginning of the downlink traffic is less than or equal to the second threshold duration.

Further aspects include a base station having a processor configured to perform one or more operations of any of the methods summarized above. Further aspects include processing devices for use in a base station configured with processor-executable instructions to perform operations of any of the methods summarized above. Further aspects include a non-transitory processor-readable storage medium having stored thereon processor-executable instructions configured to cause a processor of a base station to perform operations of any of the methods summarized above. Further aspects include a base station having means for performing functions of any of the methods summarized above.

DETAILED DESCRIPTION

Figure 1:
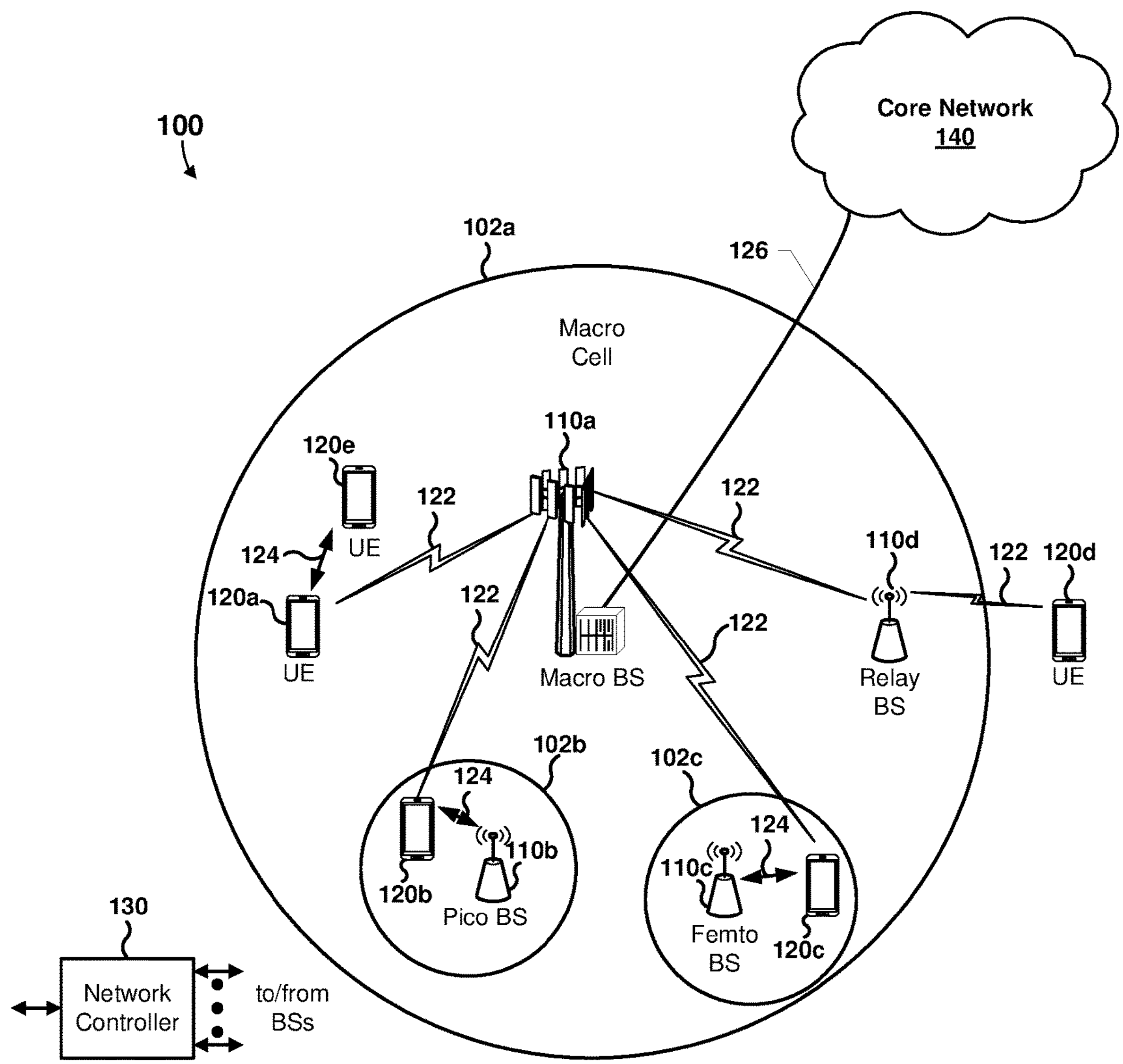
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and wireless device and base stations configured to perform the methods for managing downlink traffic reception and cross-link interference (CLI). Various embodiments enable wireless devices and base stations to dynamically manage the reception of downlink traffic, such as physical downlink shared channel (PDSCH) data or messages or a channel state information (CSI) reference signal (CSI-RS), as well as measurements of CLI performed by the wireless device. Various embodiments prioritize downlink traffic reception over CLI measurements, and dynamically manage the reception of such downlink traffic to enable the wireless device to improve downlink traffic throughput as well as perform CLI measurements.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), and other types of user equipment (UE), as well as wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA), Long Term Evolution (LTE) Fifth Generation (5G) New Radio (NR), and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In LTE 5G NR and other communication technologies, CLI may occur when an aggressor wireless device transmits uplink signals at the same time that a nearby victim wireless device attempts to receive downlink traffic. One or more uplink symbols of the aggressor wireless device's uplink signaling may collide (i.e., occur during over lapping times) with at least one downlink signal symbol of the victim wireless device. CLI may occur between wireless devices communicating in the same cell or in different cells.

A base station may schedule resources for a victim wireless device (often referred to herein as a second wireless device) to measure the CLI from an aggressor wireless device (often referred to herein as a first wireless device) and provide a report about the measured CLI to the base station. Typically, the aggressor wireless device does not transmit a special signal to facilitate measurement of CLI, and the aggressor wireless device is typically unaware that its uplink transmissions are measured by the victim wireless device.

Conventionally, for example in Third Generation Partnership Project (3GPP) Release 16, wireless devices are configured statically to prioritize CLI measurements over receiving downlink traffic for the wireless device (such as physical downlink control channel (PDCCH) traffic, PDSCH messages or data, or a CSI-RS). The reception of PDCCH traffic is typically less affected by a wireless device prioritizing CLI measurements, because the control region (in which PDCCH traffic is located) typically occurs at the beginning of a slot. CLI measurements typically measure an aggressor wireless device's transmission of a sounding reference signal (SRS) and/or uplink signaling, which does not occur at the beginning of a slot, and which have a greater chance of collision with a victim wireless device's reception of PDSCH traffic and/or a CSI-RS in a downlink.

As used herein the receive (Rx) chain circuitry of a wireless device is referred to as an "Rx resource." As used herein, the configuration of an Rx resource to receive downlink traffic or to measure CLI is referred to as an "Rx resource tuning." As used herein, the term "traffic" refers collectively to signals, messages, data, and/or other information.

A wireless device typically performs CLI measurements on different resources (e.g., frequency and channel) than used for downlink traffic reception. For wireless devices with a single Rx resource, measuring CLI and receiving downlink traffic requires the wireless device to tune its Rx chain circuitry to different tuning configurations, and for such wireless devices it is not possible to simultaneously measure CLI and receive downlink traffic. In the event of a collision between a CLI measurement opportunity and a downlink signal reception opportunity, a conventional wireless device preferentially measures CLI at the expense of downlink signal reception, which degrades downlink traffic reception performance and throughput.

Various embodiments include methods and wireless devices and base stations configured to perform the methods for managing the reception of downlink traffic (e.g., PDCCH messages or data and CSI-RS) as well as making and reporting measurements of CLI. In some embodiments, the wireless device may be configured to dynamically prioritize downlink signaling reception over performing CLI measurements.

In various embodiments, a wireless device may receive from a base station PDCCH traffic using a first Rx resource tuning of the Rx resource of the wireless device. The wireless device may determine whether a time period between an end of the PDCCH traffic and a next CLI measurement opportunity exceeds a threshold duration for tuning the Rx resource to a second Rx tuning. In response to determining that the time period between an end of the PDCCH traffic and a next CLI measurement opportunity does not exceed (i.e., is less than or equal to) the threshold duration, the wireless device may receive downlink traffic using the first Rx resource tuning. In some embodiments, in response to determining that the time period between the end of the PDCCH traffic and the next CLI measurement opportunity exceeds the threshold duration, the wireless device may tune its Rx resource to the second Rx resource tuning and perform a CLI measurement during the CLI measurement opportunity.

In some embodiments, the first threshold duration reflects a time required for the wireless device to decode the PDCCH traffic (e.g., one or more samples of the PDCCH, or one or more PDCCH candidates) and switch the tuning of the wireless device's Rx resource from a first Rx resource tuning to a second Rx resource tuning. In some embodiments, the wireless device may use the first Rx resource tuning to receive PDCCH traffic as well as downlink traffic (e.g., PDCCH messages or data and/or the CSI-RS). In some embodiments, the wireless device may use the second Rx resource tuning to perform a CLI measurement, for example, of the SRS of a nearby aggressor wireless device.

In some embodiments, in response to determining that the time period between an end of the PDCCH traffic and a next CLI measurement opportunity exceeds the threshold duration, the wireless device may determine whether the next CLI measurement opportunity overlaps with next downlink traffic. The wireless device may receive the downlink traffic using the first Rx resource tuning in response to determining that the next CLI measurement opportunity overlaps with a next downlink traffic. In response to determining that the next CLI measurement opportunity does not overlap with a next downlink, the wireless device may perform a CLI measurement using the second Rx resource tuning during the next CLI measurement opportunity. In some embodiments, the wireless device may perform a CLI measurement in a next CSI measurement opportunity that does not conflict (e.g., overlap or collide) with downlink traffic. In some embodiments, the wireless device may perform a CLI measurement using the second Rx resource tuning during a later CLI measurement opportunity that does not conflict with any downlink traffic.

In some embodiments, the wireless device may be configured to dynamically prioritize downlink traffic reception over performing a CLI measurement using the first threshold duration and a second threshold duration that reflects a time required for the wireless device to decode the PDCCH traffic, tune the Rx resource to the second Rx resource tuning to perform a CLI measurement, and tune the Rx resource to the first Rx resource tuning to receive downlink traffic.

In some embodiments, the wireless device may begin a measurement of CLI using the second Rx resource tuning. In some embodiments, the wireless device may continue decoding the PDCCH traffic (e.g., buffered or stored in a memory of the wireless device) while performing the CLI measurement. In some embodiments, when the wireless device has decoded a sufficient amount of the PDCCH traffic, the wireless device may determine (based on the decoded PDCCH traffic) whether a second time period from the end of the PDCCH signaling to a beginning of the downlink traffic exceeds the second threshold duration. In some embodiments, the wireless device may receive the downlink traffic using the first Rx resource tuning before completing the measurement of the CLI in response to determining that the second time period from the end of the PDCCH traffic to a beginning of the downlink traffic does not exceed (i.e., is less than or equal to) a second threshold duration. In some embodiments, the wireless device may abort performing the CLI measurement in response to determining that the second time period from the end of the PDCCH traffic to a beginning of the downlink traffic does not exceed (i.e., is less than or equal to) a second threshold duration. In some embodiments, the wireless device may complete the measurement of the CLI using the second Rx resource tuning in response to determining that the second time period from the end of the PDCCH traffic to a beginning of the downlink traffic exceeds the second threshold duration.

In various embodiments, a base station may be configured to schedule, or to adjust the scheduling of, downlink traffic and/or CLI measurement resources that a wireless device may use to measure CLI. In various embodiments, a base station may receive from a wireless device a capability report indicating whether the wireless device is configured to determine whether a time period between an end of PDCCH traffic and a next CLI measurement opportunity exceeds a threshold duration. In response to determining that the wireless device is not configured to determine whether the time period between the end of PDCCH traffic and the next CLI measurement opportunity exceeds the threshold duration, the base station may schedule for the wireless device downlink traffic that does not overlap with a next or later CLI measurement opportunity. downlink traffic In response to determining that the wireless device is configured to determine whether the time period between the end of PDCCH traffic and the next CLI measurement opportunity exceeds the threshold duration, the base station may schedule the PDCCH traffic and the next CLI measurement opportunity at least the threshold duration apart (e.g., relative to one another). In some embodiments, the base station may determine or adjust the timing or scheduling of the PDCCH traffic and/or the next CLI measurement opportunity. In some embodiments, the capability report may indicate whether the wireless device is configured to determine whether to switch to the second Rx resource and perform a CLI measurement by determining whether a time period between an end of the PDCCH traffic and the next cross-link interference (CLI) measurement opportunity exceeds the threshold duration.

In some embodiments, the capability report from the wireless device may indicate whether wireless device is configured to determine whether a second time period from the end of the PDCCH traffic to a beginning of the downlink traffic is less than or equal to a second threshold duration. In response to determining that the wireless device is configured to determine whether the second time period from the end of the PDCCH traffic to the beginning of the downlink traffic is less than or equal to the second threshold duration, the base station may schedule the downlink traffic at least second threshold duration after an end of the PDCCH traffic. In some embodiments, the base station may schedule downlink traffic so as to not overlap with the next CLI measurement opportunity in response to determining that the wireless device is not configured to determine whether the second time period from the end of the PDCCH traffic to the beginning of the downlink traffic is less than or equal to the second threshold duration. In some embodiments, the capability report may indicate whether the wireless device is configured to abort a CLI measurement in response to determining that the second time period from the end of the PDCCH traffic to a beginning of the downlink traffic is less than the second threshold duration.

FIG. 1 is a system block diagram illustrating an example communications system 100 suitable for implementing various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120*a*-120*e* in FIG. 1). The communications system 100 also may include a number of base stations (illustrated as the BS 110*a*, the BS 110*b*, the BS 110*c*, and the BS 110*d*) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an evolved packet core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120*a*-120*e* may be included inside a housing that houses components of the wireless device 120*a*-120*e*, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120*a* and the wireless device 120*e*) may communicate directly using one or more sidelink channels (for example, without using a base station 110*a-d* as an intermediary to communicate with one another). For example, the wireless devices 120*a-e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a*-120*e* may perform scheduling operations, resource selection operations, as well as other operations described elsewhere herein as being performed by the base station 110*a*-110*d*.

Figure 2:
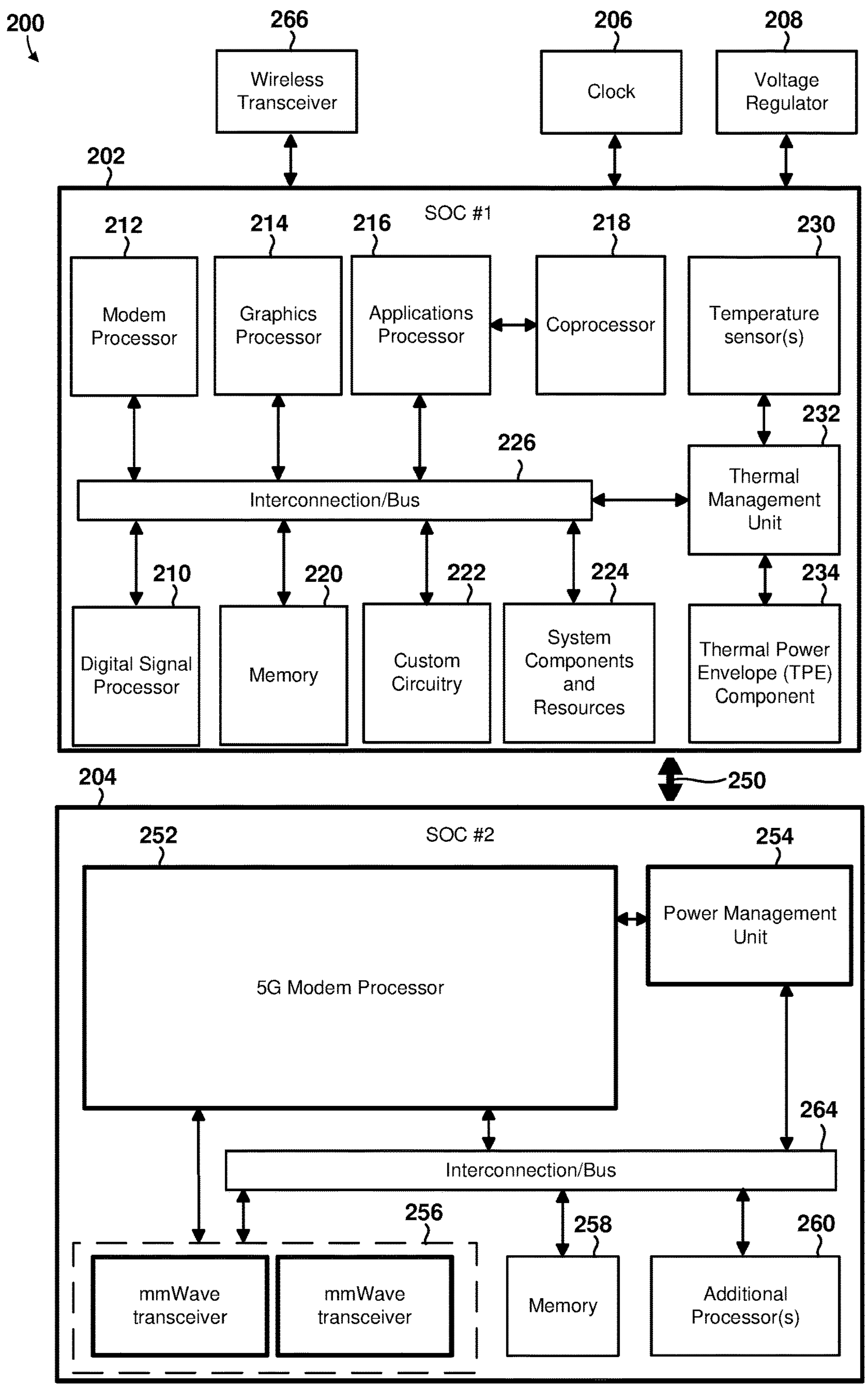
FIG. 2 is a component block diagram illustrating an example computing and wireless modem system suitable for implementing various embodiments.

FIG. 2 is a component block diagram illustrating an example computing and wireless modem system 200 suitable for implementing various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110*a*. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
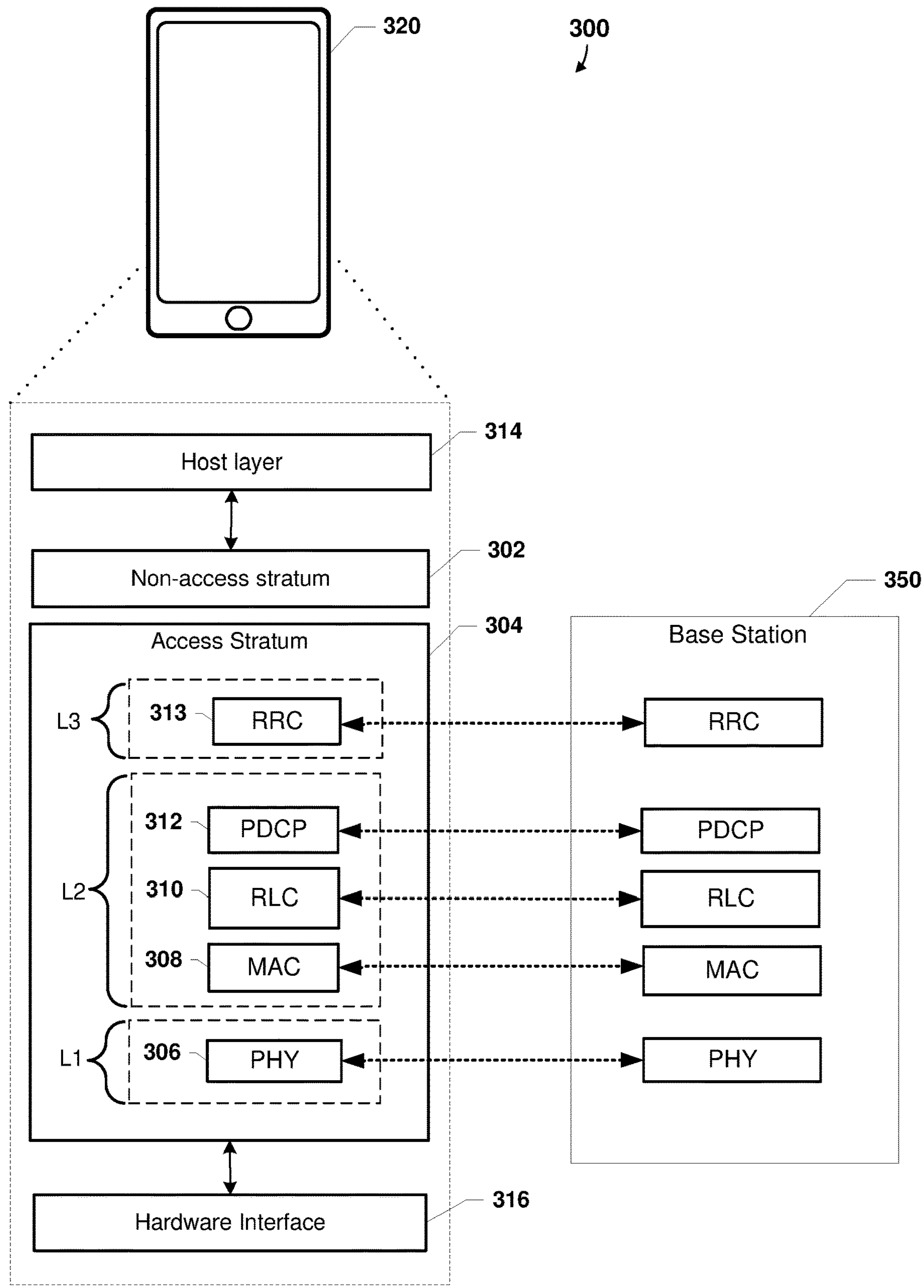
FIG. 3 is a component block diagram illustrating a software architecture including a radio protocol stack for the user and control planes in wireless communications suitable for implementing various embodiments.

FIG. 3 is a component block diagram illustrating a software architecture 300 including a radio protocol stack for the user and control planes in wireless communications suitable for implementing various embodiments. With reference to FIGS. 1-3, the wireless device 320 may implement the software architecture 300 to facilitate communication between a wireless device 320 (e.g., the wireless device 120*a*-120*e*, 200) and the base station 350 (e.g., the base station 110*a*-110*d*) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
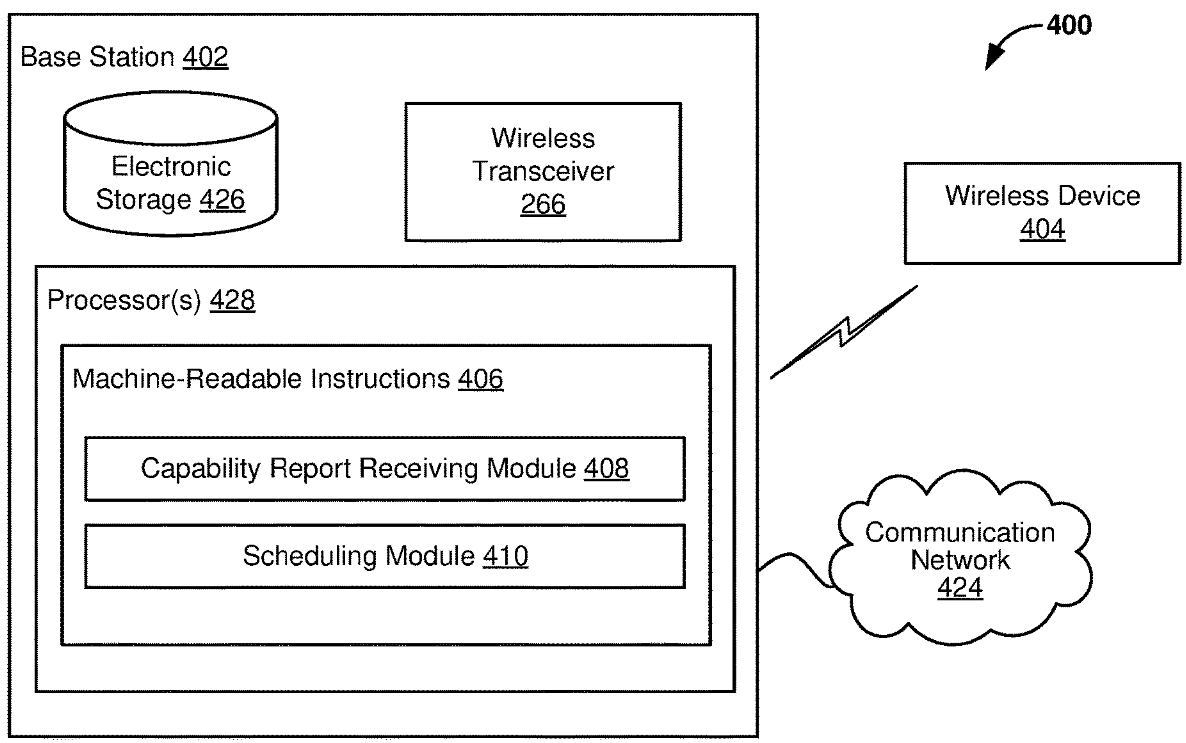
FIGS. 4A and 4B are component block diagrams illustrating an example system 400 suitable for implementing various embodiments.
Figure 4B:
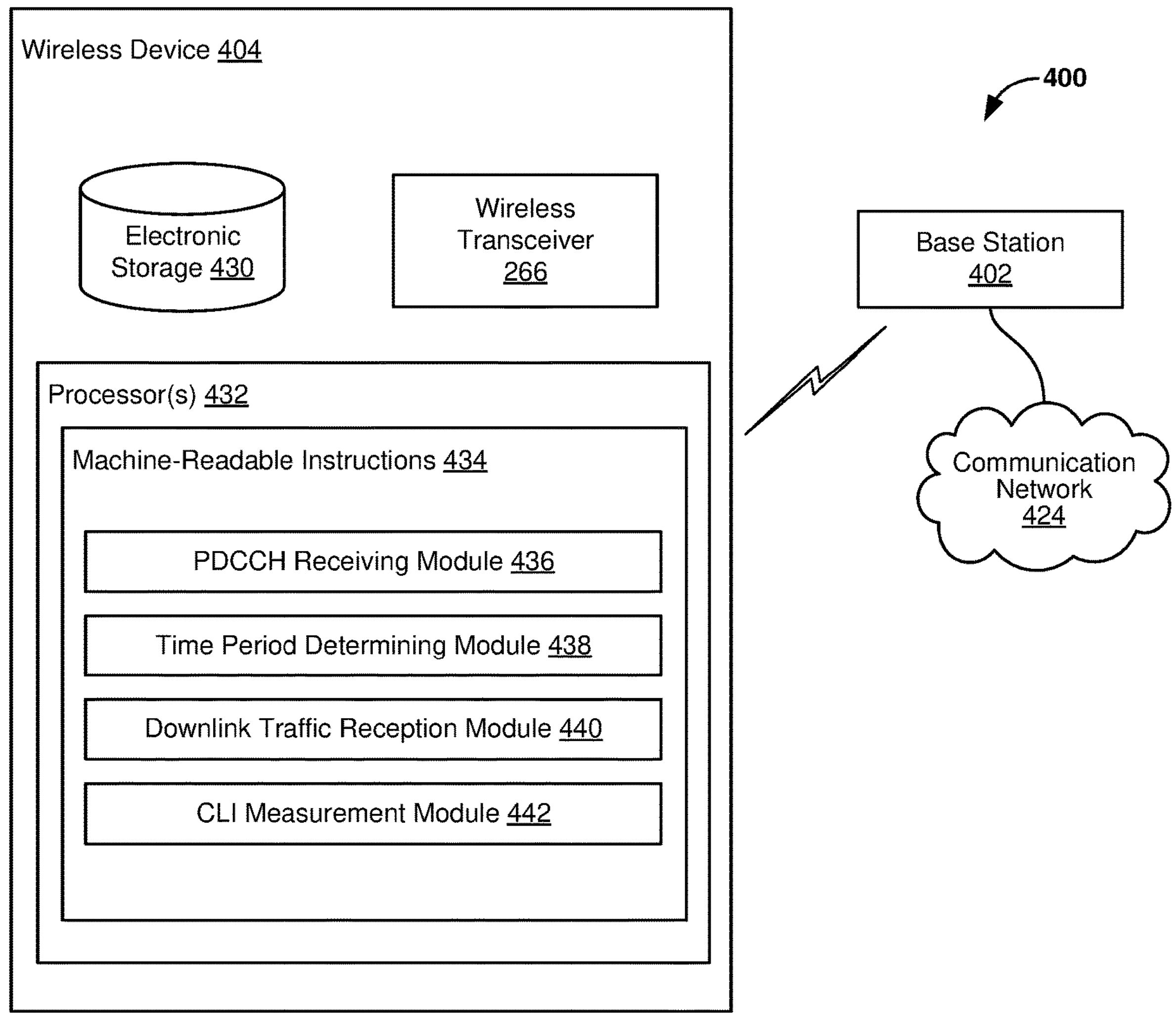

FIGS. 4A and 4B are component block diagrams illustrating an example system 400 suitable for implementing various embodiments. With reference to FIGS. 1-4B, system 400 may include a base station 402 and a wireless device 404 (e.g., 110*a*-110*d*, 120*a*-120*e*, 200, 320, 350). The base station 402 and the wireless device 404 exchange wireless communications in order to establish a wireless communication link 122, 124, 126.

The base station 402 and the wireless device 404 may include one or more processors 428, 432 coupled to electronic storage 426, 430 and a wireless transceiver (e.g., 266). In the base station 402 and the wireless device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the base station 402, the processor(s) 428 may be configured by machine-readable instructions 406. Machine-readable instructions 406 may include one or more instruction modules. The instruction modules may include computer program modules. The instruction modules may include one or more of a capability report receiving module 408, a scheduling module 410, or other instruction modules.

The capability report receiving module 408 may be configured to receive from a wireless device (e.g., 404) a capability report indicating whether the wireless device is configured to determine whether a time period between an end of physical downlink control channel (PDCCH) traffic and a next cross-link interference (CLI) measurement opportunity exceeds a threshold duration. In some embodiments, additionally or alternatively, the capability report may indicate whether the wireless device is configured to determine whether a second time period from the end of the PDCCH traffic to a beginning of the downlink traffic is less than or equal to a second threshold duration.

The scheduling module 410 may be configured to schedule for the wireless device CLI measurement resources that do not overlap with next downlink traffic such as physical downlink shared channel (PDSCH) traffic or a next channel state information reference signal (CSI-RS) in response to determining that the wireless device is not configured to determine whether the time period between the end of PDCCH traffic and the next CLI measurement opportunity exceeds the threshold duration. The scheduling module 410 may be configured to schedule the PDCCH traffic and the next CLI measurement opportunity at least the threshold duration apart in response to determining that the wireless device is configured to determine whether the time period between the end of PDCCH traffic and the next CLI measurement opportunity exceeds the threshold duration. Additionally or alternatively, the scheduling module 410 may be configured to schedule the downlink traffic at least the second threshold duration after an end of the PDCCH traffic in response to determining that the wireless device is configured to determine whether the second time period from the end of the PDCCH traffic to the beginning of the downlink traffic is less than or equal to the second threshold duration.

Referring to the wireless device 404, the processor(s) 432 may be configured by machine-readable instructions 434. Machine-readable instructions 406 may include one or more instruction modules. The instruction modules may include computer program modules. The instruction modules may include one or more of a PDCCH receiving module 436, a time period determining module 438, a downlink traffic reception module 440, a CLI measurement module 442, or other instruction modules.

The PDCCH receiving module 436 may be configured to receive PDCCH traffic from a base station using a first Rx resource tuning of an Rx resource.

The time period determining module 438 may be configured to determine whether a time period between an end of the PDCCH traffic and a next CLI measurement opportunity exceeds a threshold duration for tuning the Rx resource to a second Rx resource tuning.

The downlink traffic reception module 440 may be configured to receive downlink traffic using the first Rx resource tuning in response to determining that the time period between an end of the PDCCH traffic and a next CLI measurement opportunity does not exceed the threshold duration.

The CLI measurement module 442 may be configured to perform a CLI measurement using the second Rx resource tuning during a CLI measurement opportunity.

In some embodiments, the base station 402 and the wireless device 404 may be operatively linked via one or more electronic communication links (e.g., wireless communication link 122, 124, 126). It will be appreciated that this is not intended to be limiting, and that the scope of this disclosure includes embodiments in which the base station 402 and the wireless device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the base station 402 and the wireless device 404 and/or removable storage that is removably connectable to the base station 402 and the wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 and the wireless device 404, or other information that enables the base station 402 and the wireless device 404 to function as described herein.

The processor(s) 428, 432 may be configured to provide information processing capabilities in the base station 402 and the wireless device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-446 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-446 described below is for illustrative purposes, and is not intended to be limiting, as any of modules 408-414 and modules 436-446 may provide more or less functionality than is described. For example, one or more of the modules 408-414 and modules 436-446 may be eliminated, and some or all of its functionality may be provided by other modules 408-414 and modules 436-446. As another example, the processor(s) 428, 432 may be configured to execute one or more additional modules that may perform some or all of the functionality attributed below to one of the modules 408-414 and modules 436-446.

Figure 5A:
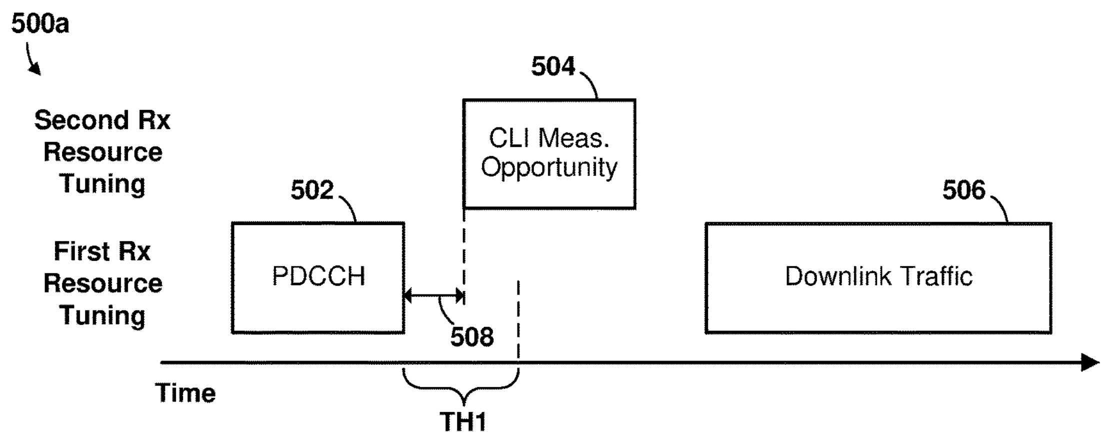
FIGS. 5A, 5B, and 5C are conceptual diagrams illustrating aspects of operations 500*a*-500*c* of a method for managing downlink traffic reception and CLI according to various embodiments.
Figure 5B:
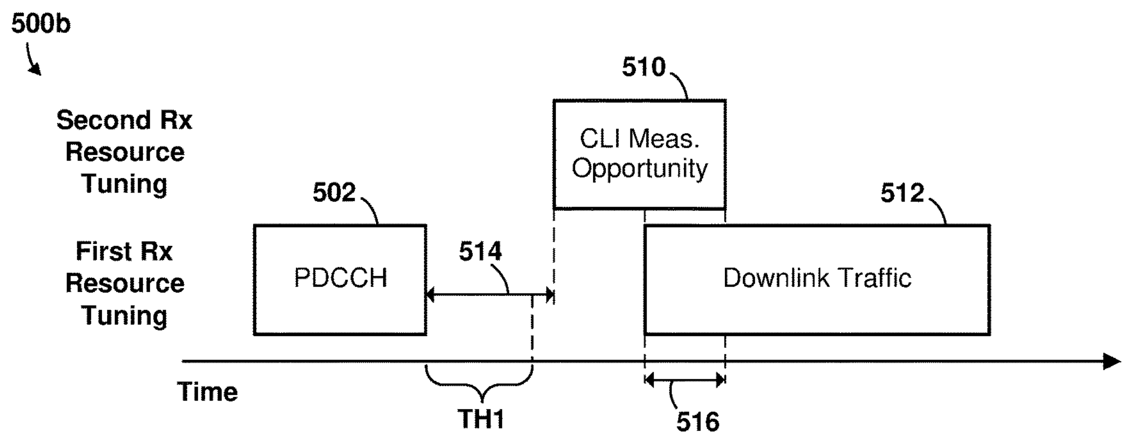
Figure 5C:
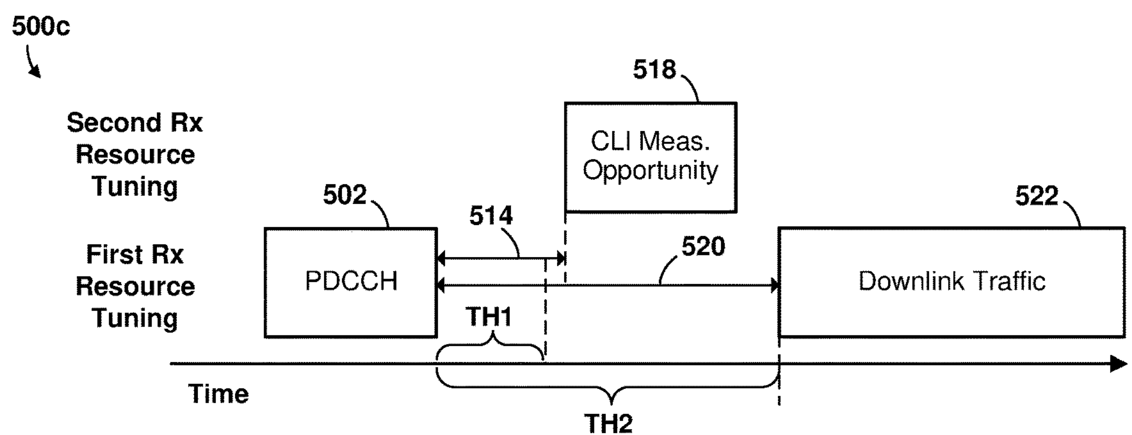

FIGS. 5A, 5B, and 5C are conceptual diagrams illustrating aspects of operations 500*a*-500*c* of a method for managing downlink signal reception and CLI according to various embodiments. With reference to FIGS. 1-5C, the operations 500*a*-500*c* may be performed by a processor (e.g., 210, 212, 214, 216, 218, 252, 260, 428, 432) of a wireless device (e.g., 120*a*-120*e*, 200, 320, 404) and/or a base station (e.g., 110*a*-110*d*, 200, 350, 402).

Referring to FIG. 5A, the wireless device may receive from a base station PDCCH traffic 502 using a first Rx resource tuning of an Rx resource. The wireless device may determine whether a time period 508 between an end of the PDCCH traffic and a beginning of a next CLI measurement opportunity 504 exceeds a threshold duration TH1 that the wireless device may require for tuning the Rx resource from the first Rx resource tuning to a second Rx resource tuning. In some embodiments, the wireless device may be configured to prioritize receiving downlink traffic (e.g., PDCCH traffic or CSI-RS) over performing a measurement of CLI. In some embodiments, in response to determining that the time period 508 does not exceed (i.e., is less than or equal to) the threshold duration TH1, the wireless device may receive the downlink traffic 506 using the first Rx resource tuning. In some embodiments, in response to determining that the time period 508 exceeds the threshold duration TH1, the wireless device may tune its Rx resource to the second Rx resource tuning and perform a CLI measurement during the CLI measurement opportunity 504.

Referring to FIG. 5B, in some embodiments, in response to determining that the time period between the end of the PDCCH traffic and the beginning of the next CLI measurement opportunity exceeds the threshold duration, the wireless device may determine whether the next CLI measurement opportunity overlaps 516 with next downlink traffic. For example, the wireless device may determine that a time period 514 between the end of the PDCCH traffic 502 and the beginning of the next CLI measurement opportunity 510 exceeds the threshold duration TH1. In such embodiments, in response to determining that the next CLI measurement opportunity overlaps 516 with next downlink traffic 512, the wireless device may receive downlink traffic 512 (e.g., PDCCH traffic or CSI-RS) using the first Rx resource tuning. In some embodiments, the wireless device may keep its Rx resource tuned to the first Rx resource tuning and may not tune the Rx resource to the second Rx resource tuning. In some embodiments, at a future time the wireless device may perform a CLI measurement using the second Rx resource tuning during a later CLI measurement opportunity (not illustrated) that does not conflict with the downlink traffic 512.

In response to determining that the next CLI measurement opportunity 510 does not overlap with the downlink traffic 512, the wireless device may tune the Rx resource to the second Rx resource tuning and perform a CLI measurement during the CLI measurement opportunity 510.

Referring to FIG. 5C, in some embodiments, the wireless device may determine whether there is sufficient time to perform a CLI measurement using the second Rx resource tuning and then tune the Rx resource to the first Rx resource running and receive downlink traffic. In some embodiments, in response to determining that the time period 514 between the end of the PDCCH traffic 502 and the beginning of the next CLI measurement opportunity 518 does not exceed the threshold duration TH1, the wireless device may tune the Rx resource to the second Rx resource tuning and begin performing a measurement of the CLI during the CLI measurement opportunity 518.

In some embodiments, the wireless device may continue to decode buffered PDCCH traffic 502 while performing the CLI measurement. In some embodiments, the wireless device may determine based on the decoded PDCCH traffic whether a second time period 520 from the end of the PDCCH traffic 502 to a beginning of the downlink traffic 522 (e.g., PDCCH traffic or CSI-RS) exceeds a second threshold duration TH2. In some embodiments, the second threshold duration TH2 may represent an amount of time required for the wireless device to decode the PDCCH traffic, tune the Rx resource to the second Rx resource tuning and perform the CLI measurement, and tune the Rx resource to the first Rx resource tuning to receive the downlink traffic 522.

In some embodiments, in response to determining that the second time period 520 does not exceed the second threshold duration TH2, the wireless device may receive the downlink traffic 522 using the first Rx resource tuning before completing the measurement of the CLI. In some embodiments, the wireless device may abort the performance of the CLI measurement and tune the Rx resource to the first Rx resource tuning. For example, before the wireless device has completed decoding the PDCCH traffic, the wireless device may tune the Rx resource to the second Rx resource tuning and perform the CLI measurement during the CLI measurement opportunity 518. After beginning to measure CLI, the wireless device may decode a sufficient amount of the PDCCH traffic to determine the schedule of the upcoming downlink traffic 518. The wireless device may determine that the second time period 520 from the end of the PDCCH traffic to the beginning of the downlink traffic 518 does not exceed the second threshold duration TH2, and in response, the wireless device may tune the Rx resource to the first Rx resource tuning and receive the downlink traffic 518. In some embodiments, the wireless device may measure CLI during a subsequent CLI measurement opportunity (not illustrated) that does not conflict with or overlap with the downlink traffic, or with subsequent downlink traffic.

In some embodiments, a base station may receive from a wireless device a capability report indicating whether the wireless device is configured to determine whether a time period (e.g., 508, 514) between an end of PDCCH traffic and a beginning of a next CLI measurement opportunity exceeds a threshold duration (e.g., TH1). In some embodiments, the capability report may indicate whether the wireless device is configured to determine whether to switch to the second Rx resource and perform a CLI measurement by determining whether a time period between an end of the PDCCH traffic and the beginning of the next CLI measurement opportunity exceeds the threshold duration. In some embodiments, the capability report sent by the wireless device may include one or more thresholds (e.g., TH1, TH2).

In some embodiments, the base station may schedule for the wireless device CLI measurement resources that do not overlap with upcoming downlink traffic (e.g., 506, 518) in response to determining that the wireless device is not configured to determine whether the time period between the end of PDCCH traffic (e.g., 508, 514) and the beginning of the next CLI measurement opportunity exceeds the threshold duration (e.g., TH1). In some embodiments, the base station may schedule the PDCCH traffic and the next CLI measurement opportunity at least the threshold duration apart (i.e., in time) in response to determining that the wireless device is configured to determine whether the CLI measurement can be performed (e.g., whether the wireless device has sufficient time to perform the CLI measurement) by determining whether the time period between the end of PDCCH traffic and the beginning of the next CLI measurement opportunity exceeds the threshold duration.

In some embodiments, the wireless device may send a capability report that includes an indication of whether the wireless device is configured to determine whether a second time period (e.g., 520) from the end of the PDCCH traffic (e.g., 502) to a beginning of the downlink traffic 518 is less than or equal to a second threshold duration (e.g., TH2). In some embodiments, the capability report may indicate whether the wireless device is configured to abort a CLI measurement in response to determining that a second time period from the end of the PDCCH traffic to a beginning of the downlink traffic is less than or equal to the second threshold duration. In response to determining that the wireless device is configured to determine whether the second time period from the end of the PDCCH traffic (e.g., 502) to a beginning of the downlink traffic 518 is less than or equal to the second threshold duration, the base station may schedule the downlink traffic (e.g., PDCCH traffic or CSI-RS) at least the second threshold duration (e.g., TH2) after the end of the PDCCH traffic. In some embodiments, the base station may schedule downlink traffic so as to not overlap with the next CLI measurement opportunity in response to determining that the wireless device is not configured to determine whether the second time period from the end of the PDCCH traffic to the beginning of the downlink traffic is less than or equal to the second threshold duration.

Figure 6A:
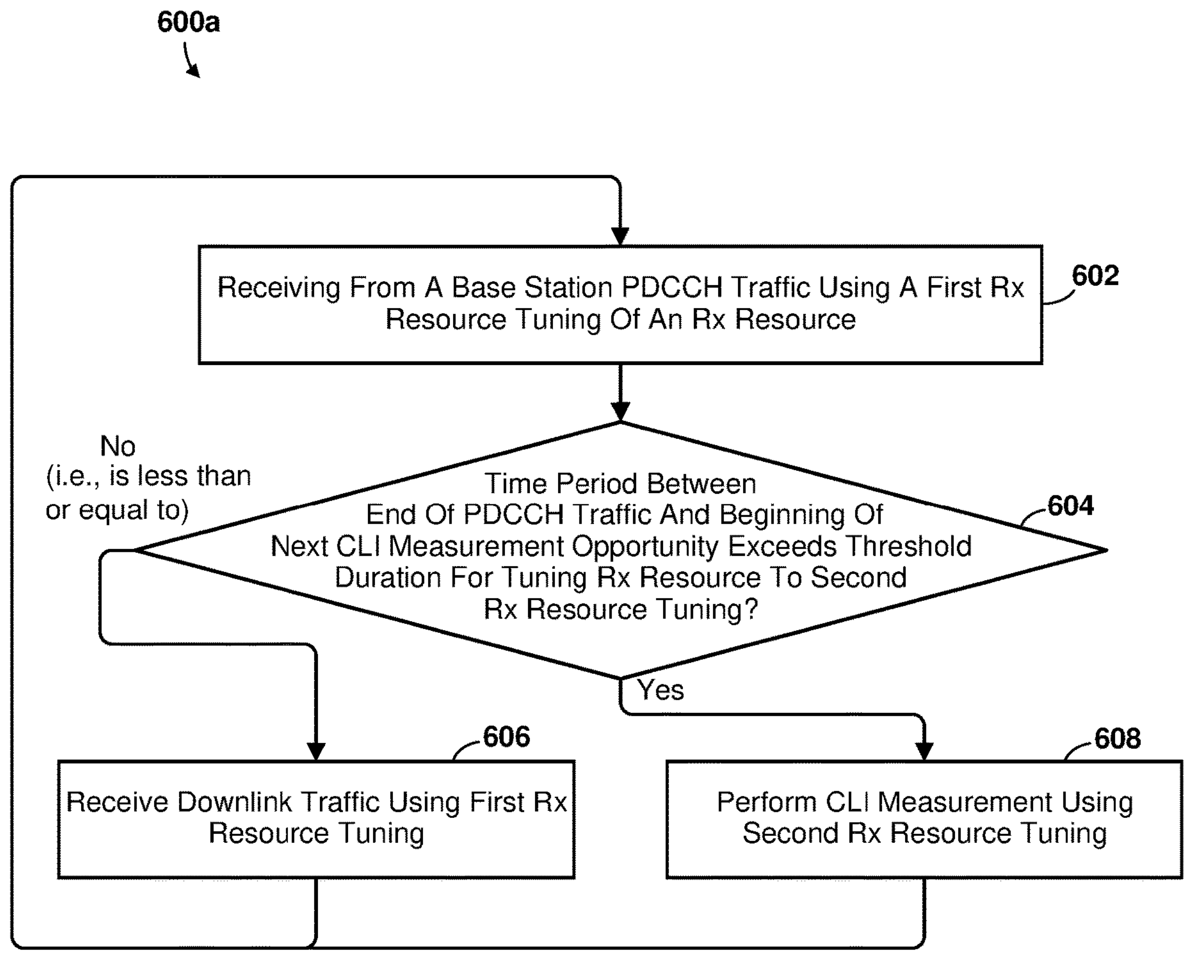
FIG. 6A is a process flow diagram illustrating a method performed by a processor of a wireless device for enhancing coverage for managing downlink traffic reception and CLI according to various embodiments.

FIG. 6A is a process flow diagram illustrating a method 600*a* performed by a processor of a wireless device for enhancing coverage for managing downlink traffic reception and CLI according to various embodiments. With reference to FIGS. 1-6A, the method 600*a* may be performed by a processor (e.g., 210, 212, 214, 216, 218, 252, 260, 428, 432) of a wireless device (e.g., 120*a*-120*e*, 200, 320, 404).

In block 602, the processor may receive from a base station (e.g., 110*a*-110*d*, 402) physical downlink control channel (PDCCH) traffic using a first receive (Rx) resource tuning of an Rx resource.

In determination block 604, the processor may determine whether a time period between an end of the PDCCH traffic and a beginning of a next CLI measurement opportunity exceeds a threshold duration for tuning the Rx resource to a second Rx resource tuning.

In response to determining that the time period between the end of the PDCCH traffic and the beginning of the next CLI measurement opportunity is less than equal to the threshold duration for tuning the Rx resource to a second Rx resource tuning (i.e., determination block 604="No"), the processor may receive downlink traffic using the first Rx resource tuning in block 606. In some embodiments, the downlink traffic may include physical downlink shared channel (PDSCH) traffic or a channel state information reference signal (CSI-RS)

In response to determining that the time period between the end of the PDCCH traffic and the beginning of the next CLI measurement opportunity exceeds the threshold duration for tuning the Rx resource to a second Rx resource tuning (i.e., determination block 604="Yes"), the processor may perform a CLI measurement using the second Rx resource tuning in block 608.

Following the performance of the operations of block 606 or block 608, the processor may again perform the operations of block 602 as described.

Figure 6B:
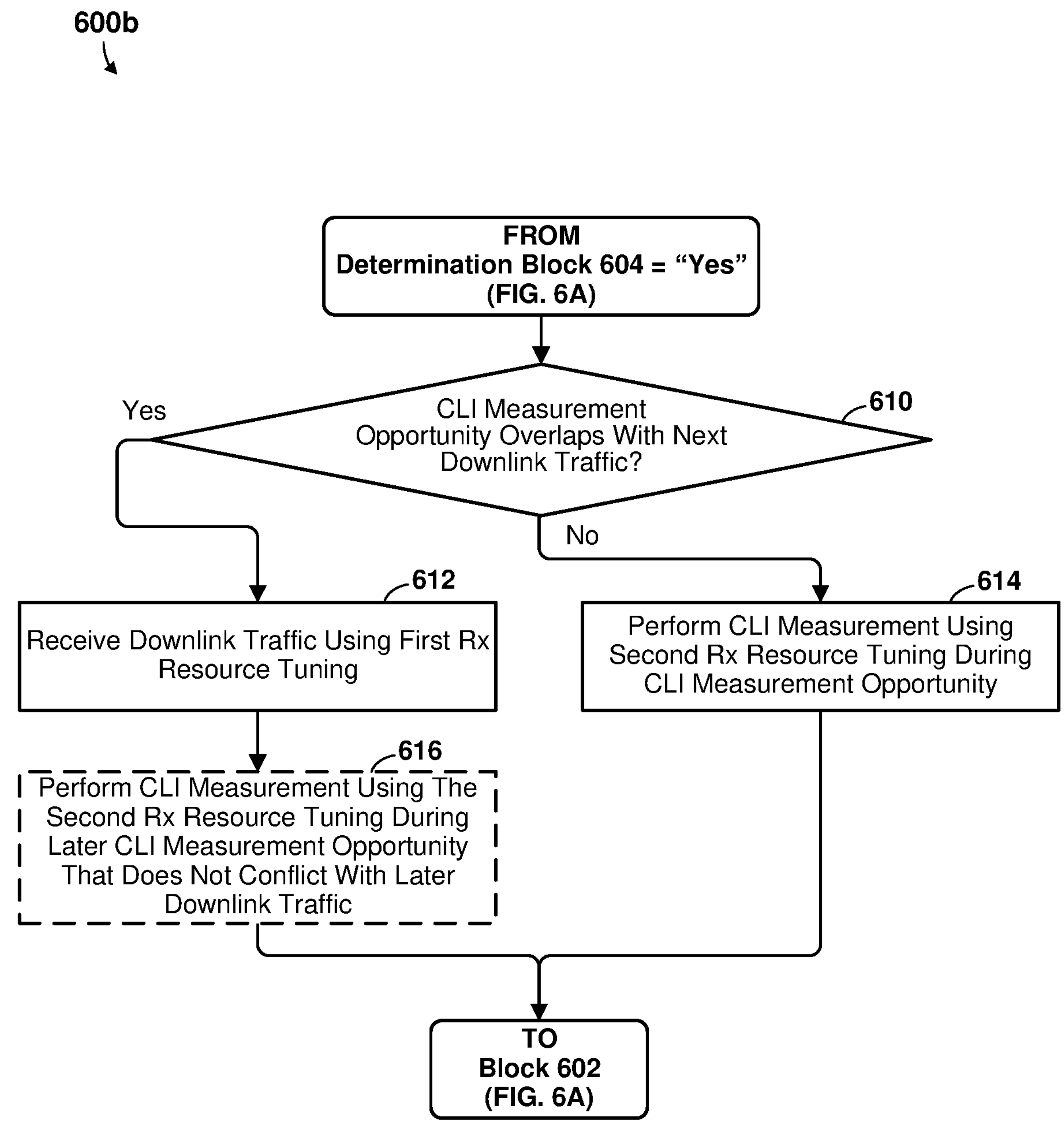
FIGS. 6B and 6C are process flow diagrams illustrating operations that may be performed by a processor of a wireless device as part of the method for enhancing coverage for managing downlink traffic reception and CLI according to various embodiments.
Figure 6C:
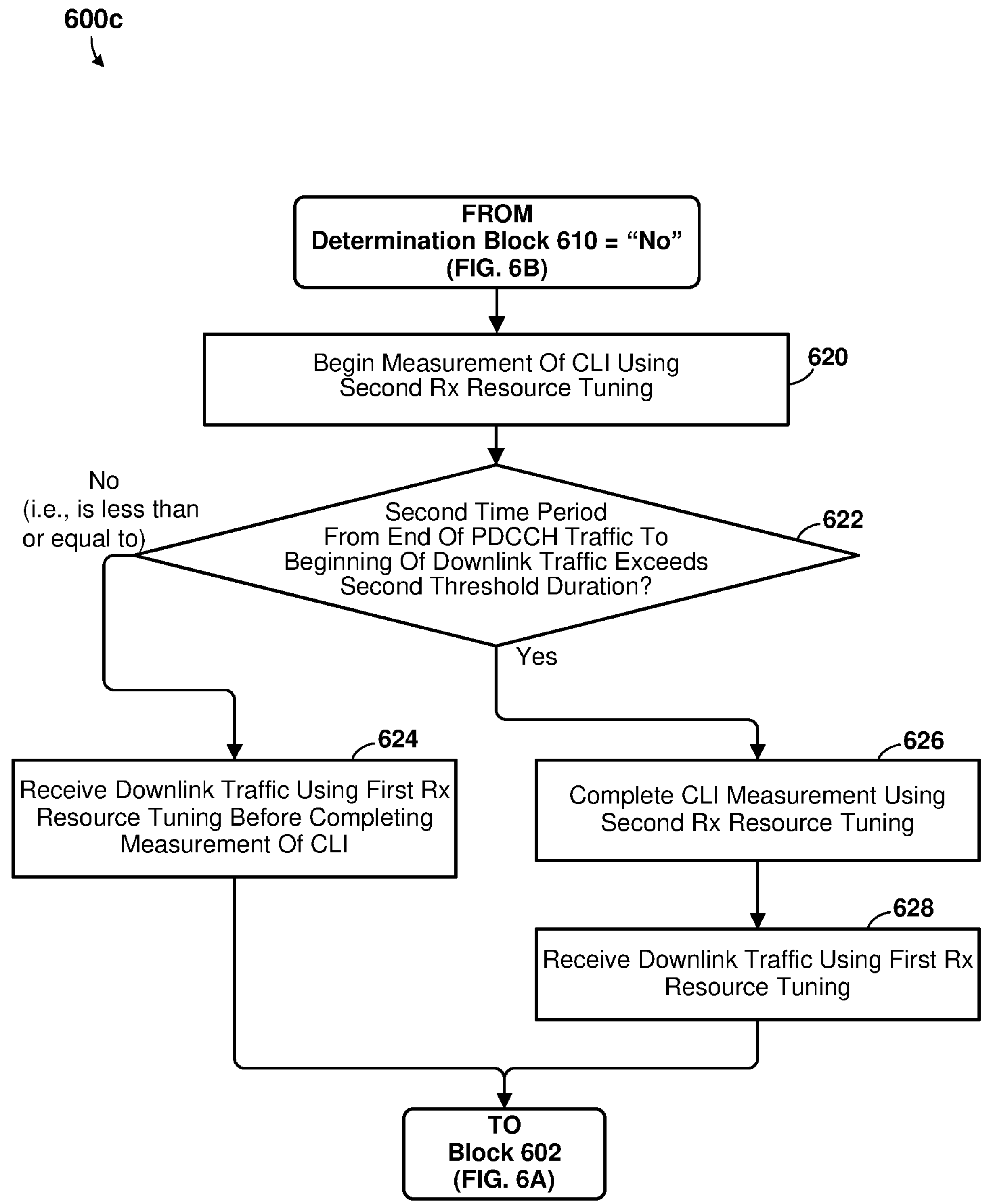

FIGS. 6B and 6C are process flow diagrams illustrating operations 600*b* and 600*c* that may be performed by a processor of a wireless device as part of the method 600*a* for enhancing coverage for managing downlink traffic reception and CLI according to various embodiments. With reference to FIGS. 1-6C, the operations 600*b* and 600*c* may be performed by a processor (e.g., 210, 212, 214, 216, 218, 252, 260, 428, 432) of a wireless device (e.g., 120*a*-120*e*, 200, 320, 404).

Referring to FIG. 6B, in some embodiments, in response to determining that the time period between an end of the PDCCH data and a next CLI measurement opportunity exceeds the threshold duration (i.e., determination block 604="Yes"), the processor may determine whether the next CLI measurement opportunity overlaps with a next PDSCH data or CSI-RS in determination block 610.

In response to determining that the next CLI measurement opportunity overlaps with next downlink traffic (i.e., determination block 610="Yes"), the processor may receive the downlink traffic using the first Rx resource tuning in block 612.

In optional block 616, the processor may perform a CLI measurement using the second Rx resource tuning during a later CLI measurement opportunity that does not conflict with downlink traffic. In some embodiments, after receiving the downlink traffic, the processor may receive a resource allocation or scheduling information from the base station indicating that another CLI measurement opportunity will be available. In such embodiments, provided that the upcoming CLI measurement opportunity does not conflict with (e.g., overlap with) downlink traffic, the processor may perform a CLI measurement during the upcoming CLI measurement opportunity.

In response to determining that the next CLI measurement opportunity does not overlap with a next downlink traffic (i.e., determination block 610="No"), the processor may perform a CLI measurement using the second Rx resource tuning during the next CLI measurement opportunity in block 614.

Following the performance of the operations of block 614, or block 612 or optional block 616, the processor may again perform the operations of block 602 (FIG. 6A) as described.

Referring to FIG. 6C, in some embodiments, in response to determining that the next CLI measurement opportunity does not overlap with the next downlink traffic (i.e., determination block 610="No"), the processor may begin a measurement of the CLI using the second Rx resource tuning in block 620. In some embodiments, the processor may decode received PDCCH traffic while the processor performs the CLI measurement.

In determination block 622, the processor may determine based on decoded PDCCH traffic whether a second time period from the end of the PDCCH traffic to a beginning of the downlink traffic exceeds a second threshold duration.

In response to determining that the second time period from the end of the PDCCH traffic to a beginning of the downlink traffic does not exceed (i.e., is less than or equal to) a second threshold duration (i.e., determination block 622="No"), the processor may receive the downlink traffic using the first Rx resource tuning before completing the measurement of the CLI in block 624.

In response to determining that the second time period from the end of the PDCCH traffic to a beginning of the downlink traffic exceeds the second threshold duration (i.e., determination block 622="Yes"), the processor may complete the measurement of the CLI using the second Rx resource tuning in block 626.

In block 628, the processor may receive the downlink traffic using the first Rx resource tuning.

Following the performance of the operations of block 624 or block 628, the processor may again perform the operations of block 602 (FIG. 6A) as described.

Figure 7A:
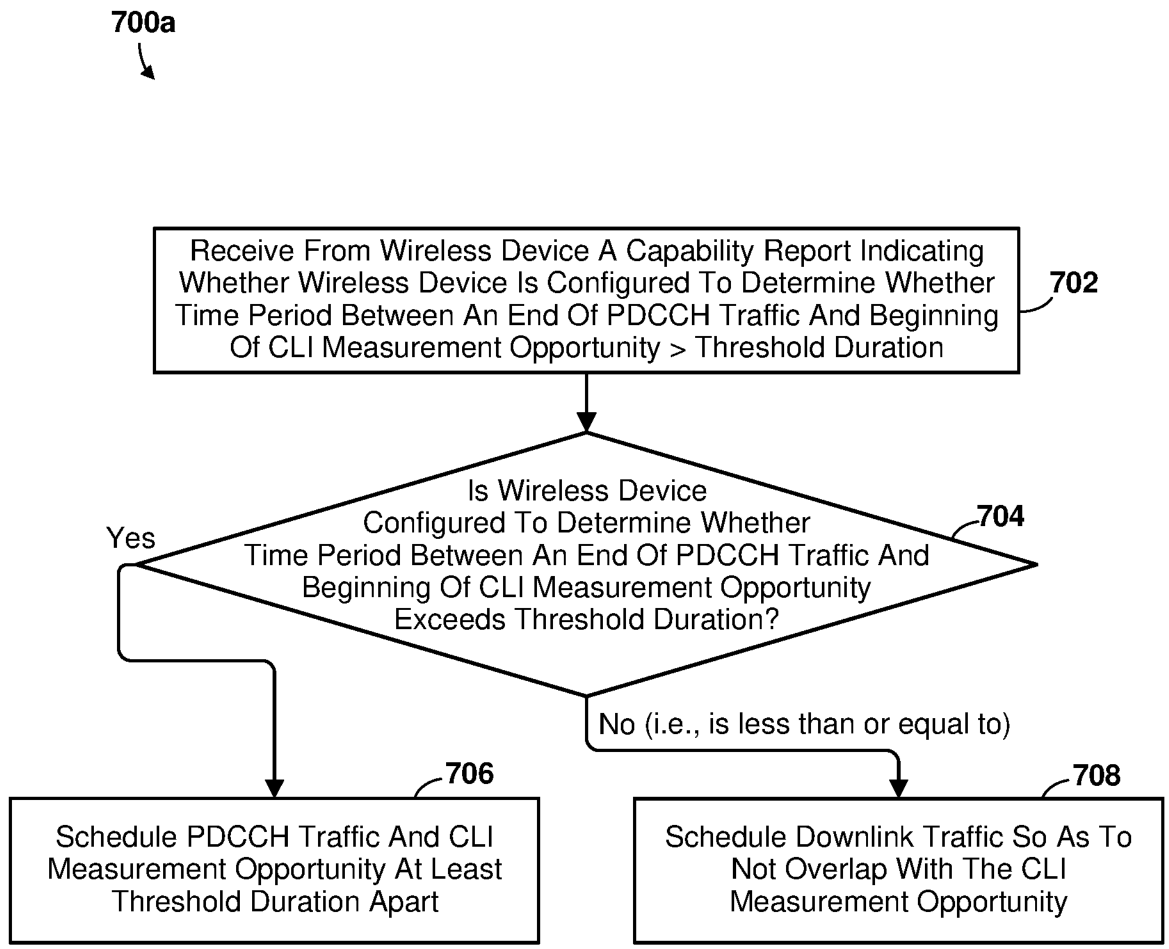
FIG. 7A is a process flow diagram illustrating a method performed by a processor of a base station for enhancing coverage for managing downlink traffic reception and CLI according to various embodiments.

FIG. 7A is a process flow diagram illustrating a method 700*a* performed by a processor of a base station for enhancing coverage for managing downlink traffic reception and CLI according to various embodiments. With reference to FIGS. 1-7A, the method 600*a* may be performed by a processor (e.g., 210, 212, 214, 216, 218, 252, 260, 428, 432) of a base station (e.g., 110*a*-110*d*, 200, 350, 402).

In block 702, the processor may receive from a wireless device a capability report indicating whether the wireless device is configured to determine whether a time period between an end of PDCCH traffic and a beginning of a next CLI measurement opportunity exceeds a threshold duration. In some embodiments, the capability report may indicate whether the wireless device is configured to determine whether to switch to the second Rx resource tuning and perform a CLI measurement by determining whether a time period between an end of physical downlink control channel (PDCCH) traffic and a beginning of a next cross-link interference (CLI) measurement opportunity exceeds the threshold duration. In some embodiments, the capability report may indicate whether the wireless device is configured to determine whether there is sufficient time to decode PDCCH traffic using the first Rx resource tuning and then tune its Rx resource to the second Rx resource tuning to perform the CLI measurement.

In determination block 704, the processor may determine whether the wireless device is configured to determine whether the time period between the end of PDCCH signaling and the beginning of the next CLI measurement opportunity exceeds a threshold duration (e.g., based on the capability report). In some embodiments, the processor may determine whether the wireless device is configured to determine whether to perform the CLI measurement by determining whether the time period between the end of PDCCH signaling and the beginning of the next CLI measurement opportunity exceeds the threshold duration.

In response to determining that the wireless device is configured to determine whether the time period between the end of PDCCH signaling and the beginning of the next CLI measurement opportunity exceeds a threshold duration (i.e., determination block 704="Yes"), the processor may schedule the PDCCH traffic and the next CLI measurement opportunity at least the threshold duration apart in block 706. For example, the determination that the wireless device is configured to determine whether the time period between the end of PDCCH signaling and the next CLI measurement opportunity exceeds a threshold duration may indicate that the wireless device require the PDCCH traffic and the next CLI measurement to occur (or to be scheduled) at least the threshold duration apart from each other in time. In some embodiments, the threshold duration may indicate a duration of time in which the wireless device may perform a CLI measurement. In some embodiments, the base station may schedule the PDCCH traffic and the next CLI measurement opportunity at least the threshold duration apart to provide the wireless device sufficient time to decode PDCCH traffic and then tune a receive (Rx) resource from a first Rx resource tuning that enables the wireless device to receive the PDCCH traffic to a second Rx resource tuning to perform the CLI measurement.

In response to determining that the wireless device is not configured to determine whether the time period between the end of PDCCH signaling and the beginning of the next CLI measurement opportunity exceeds the threshold duration (i.e., determination block 704="No"), the processor may schedule downlink traffic so as to not overlap with the next CLI measurement opportunity in block 708. For example, the processor may schedule the downlink traffic long enough after the CLI measurement opportunity that the wireless device can tune a receive (Rx) resource from the second Rx resource frequency that enables the wireless device to perform the CLI measurement to the first Rx resource frequency to receive the downlink traffic. In some embodiments, the downlink traffic may include physical downlink shared channel (PDSCH) traffic or a channel state information reference signal (CSI-RS).

Figure 7B:
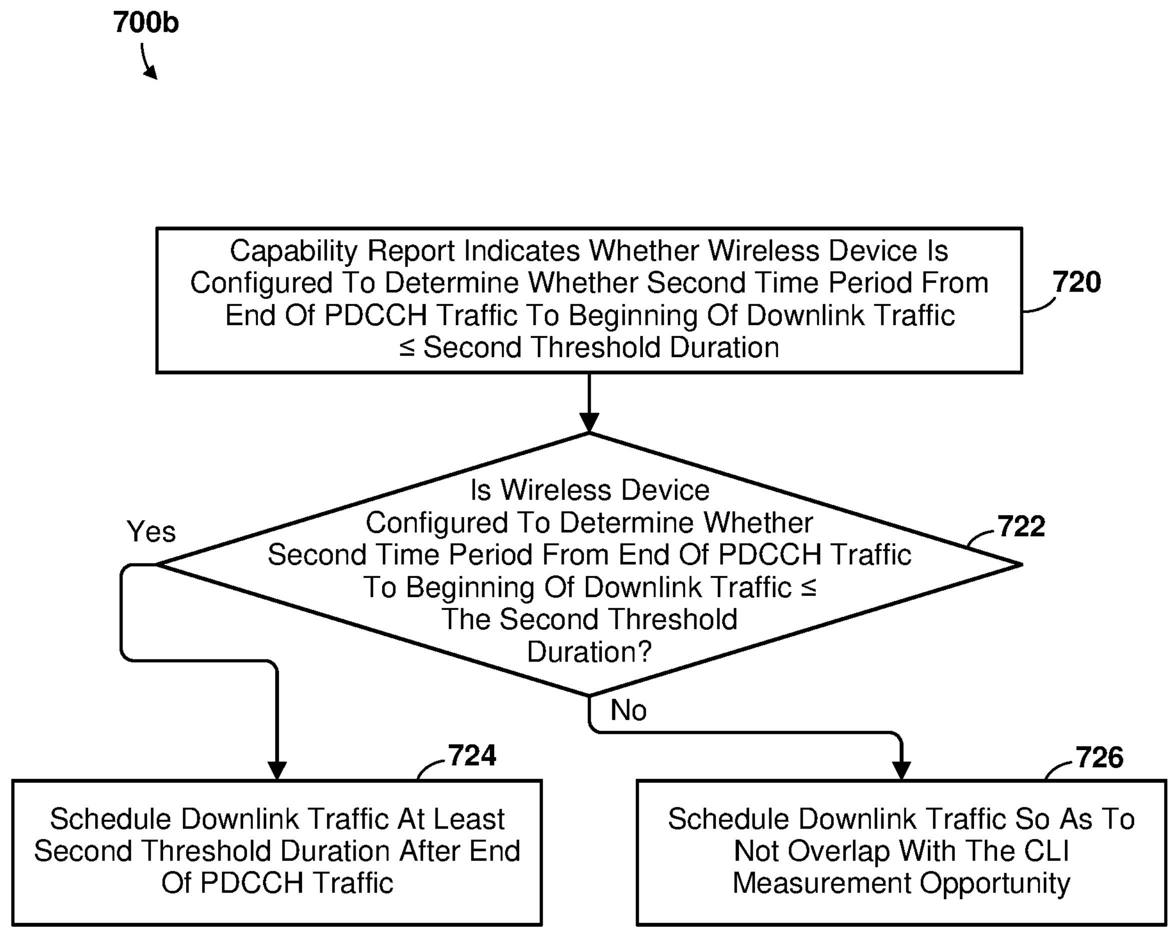
FIG. 7B is a process flow diagram illustrating operations that may be performed by a processor of a base station as part of the method for managing downlink traffic reception and CLI according to various embodiments.

FIG. 7B is a process flow diagrams illustrating operations 700*b* that may be performed by a processor of a base station as part of the method 700*a* for managing downlink traffic reception and CLI according to various embodiments. With reference to FIGS. 1-7B, the operations 700*b* may be performed by a processor (e.g., 210, 212, 214, 216, 218, 252, 260, 428, 432) of a base station (e.g., 110*a*-110*d*, 200, 350, 402).

In block 720, the processor may receive a capability report from the wireless device that indicates whether the wireless device is configured to determine whether a second time period from the end of the PDCCH traffic to a beginning of downlink traffic (e.g., PDSCH traffic or CSI-RS) exceeds a second threshold duration. In some embodiments, the capability report may indicate whether the wireless device is configured to determine whether there is sufficient time to tune its Rx resource to the second Rx resource frequency to perform the CLI measurement and then tune the Rx resource back to the first Rx resource frequency to receive the downlink traffic. As described, in some embodiments, the wireless device may be configured to abort or cancel the performance of a CLI measurement and tune its Rx resource to receive downlink traffic. In some embodiments, the capability report may indicate whether the wireless device is configured to make such a determination. In some embodiments, the capability report may be combined with, may be sent with, or may be a separate capability report from other capability reports from the wireless device (e.g., the capability report of block 702).

In determination block 722, the processor may determine whether the wireless device is configured to determine whether the second time period from the end of the PDCCH signaling to a beginning of the downlink traffic exceeds a second threshold duration (e.g., based on the capability report). In some embodiments, the processor may determine whether the wireless device is configured to determine whether there is sufficient time to tune its Rx resource to the second Rx resource frequency to perform the CLI measurement and then tune the Rx resource back to the first Rx resource frequency to receive the downlink traffic.

In response to determining that the wireless device is configured to determine whether the second time period from the end of the PDCCH signaling to the beginning of the PDSCH signaling or CSI-RS exceeds the second threshold duration (i.e., determination block 722="Yes"), the processor may schedule the PDSCH signaling or CSI-RS at least second threshold duration after an end of the PDCCH signaling in block 724.

In response to determining that the wireless device is not configured to determine whether the second time period from the end of the PDCCH signaling to the beginning of the PDSCH signaling or CSI-RS exceeds the second threshold duration (i.e., determination block 722="No"), the processor may schedule downlink traffic so as to not overlap with the CLI measurement opportunity in block 726. For example, in response to determining that the wireless device is not configured to determine whether there is sufficient time to tune its Rx resource to the second Rx resource tuning to perform the CLI measurement and then tune the Rx resource back to the first Rx resource tuning to receive the downlink traffic, the base station may schedule the CLI measurement opportunity and the downlink traffic so that the CLI measurement opportunity and the downlink traffic do not overlap.

Figure 8:
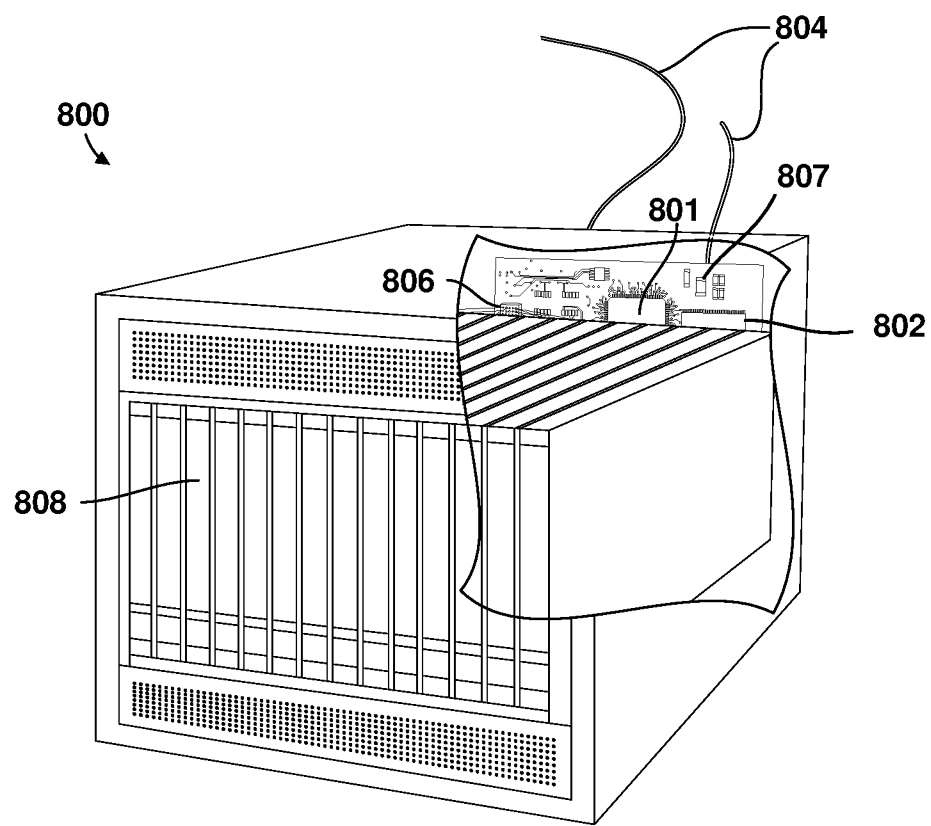
FIG. 8 is a component block diagram of a base station computing device suitable for use with various embodiments.

FIG. 8 is a component block diagram of a base station computing device suitable for use with various embodiments. Such base station computing devices (e.g., base station 110*a*-110*d*, 350, 402) may include at least the components illustrated in FIG. 8. With reference to FIGS. 1-8, the base station computing device 800 may typically include a processor 801 coupled to volatile memory 802 and a large capacity nonvolatile memory, such as a disk drive 808. The base station computing device 800 also may include a peripheral memory access device 806 such as a floppy disc drive, compact disc (CD) or digital video disc (DVD) drive coupled to the processor 801. The base station computing device 800 also may include network access ports 804 (or interfaces) coupled to the processor 801 for establishing data connections with a network, such as the Internet or a local area network coupled to other system computers and servers. The base station computing device 800 may include one or more antennas 807 for sending and receiving electromagnetic radiation that may be connected to a wireless communication link. The base station computing device 800 may include additional access ports, such as USB, Firewire, Thunderbolt, and the like for coupling to peripherals, external memory, or other devices.

Figure 9:
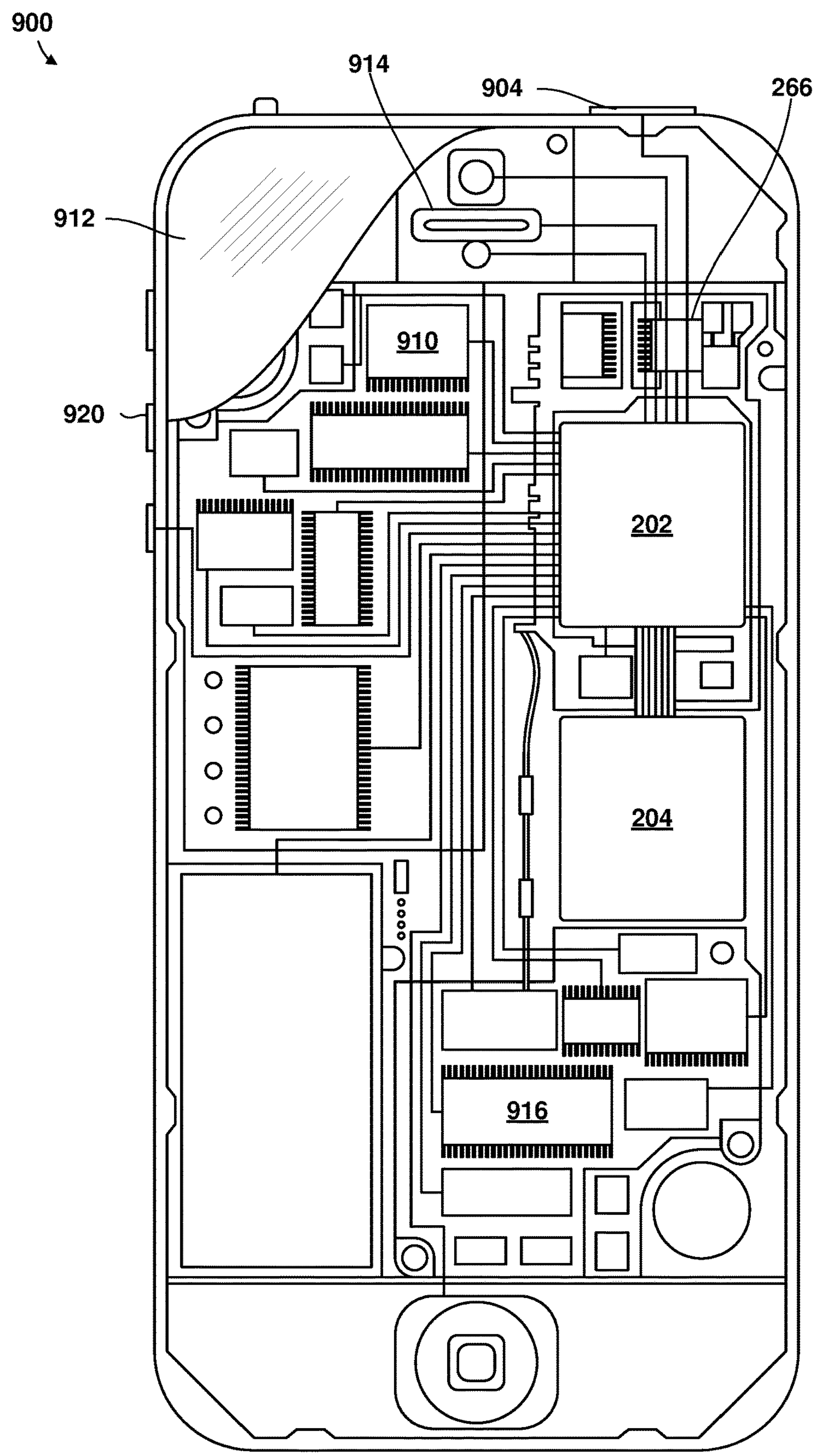
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (for example, the wireless device 120*a*-120*e*, 200, 320, 404), an example of which is illustrated in FIG. 9 in the form of a smartphone. The wireless device 900 may include a first SOC 202 (for example, a SOC-CPU) coupled to a second SOC 204 (for example, a 5G capable SOC). The first and second SOCs 202, 204 may be coupled to internal memory 916, a display 912, and to a speaker 914. Additionally, the wireless device 900 may include an antenna 904 for sending and receiving electromagnetic radiation that may be connected to a wireless transceiver 266 coupled to one or more processors in the first and/or second SOCs 202, 204. Wireless device 900 may include menu selection buttons or rocker switches 920 for receiving user inputs.

The wireless device 900 wireless device 900 may include a sound encoding/decoding (CODEC) circuit 910, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 910 may include a digital signal processor (DSP) circuit (not shown separately).

The processors of the base station computing device 800 and the wireless device 900 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 600*a*, 600*b*, 600*c*, 700*a*, and 700*b* may be substituted for or combined with one or more operations of the methods and operations 600*a*, 600*b*, 600*c*, 700*a*, and 700*b*.

Implementation examples are described in the following paragraphs. While some of the following implementation examples are described in terms of example methods, further example implementations may include: the example methods discussed in the following paragraphs implemented by a wireless device or base station including a processor configured with processor-executable instructions to perform operations of the methods of the following implementation examples; the example methods discussed in the following paragraphs implemented by a wireless device or base station including means for performing functions of the methods of the following implementation examples; and the example methods discussed in the following paragraphs may be implemented as a non-transitory processor-readable storage medium having stored thereon processor-executable instructions configured to cause a processor of a wireless device or base station to perform the operations of the methods of the following implementation examples.

Example 1. A method performed by a processor of a wireless device for managing downlink traffic reception and cross-link interference (CLI), including receiving from a base station physical downlink control channel (PDCCH) traffic using a first receive (Rx) resource tuning of an Rx resource; determining whether a time period between an end of the PDCCH traffic and a beginning of a CLI measurement opportunity exceeds a threshold duration for tuning the Rx resource to a second Rx resource tuning; and receiving downlink traffic using the first Rx resource tuning in response to determining that the time period between the end of the PDCCH traffic and the beginning of the CLI measurement opportunity is less than or equal to the threshold duration.

Example 2. The method of claim 1, in which the downlink traffic includes physical downlink shared channel (PDSCH) traffic or a channel state information reference signal (CSI-RS).

Example 3. The method of any of examples 1 and 2, further including determining whether the CLI measurement opportunity overlaps with downlink traffic in response to determining that the time period between an end of the PDCCH traffic and the beginning of the CLI measurement opportunity exceeds the threshold duration; and receiving the downlink traffic using the first Rx resource tuning in response to determining that the next CLI measurement opportunity overlaps with the downlink traffic.

Example 4. The method of example 3, further including performing a CLI measurement using the second Rx resource tuning during the CLI measurement opportunity in response to determining that the CLI measurement opportunity does not overlap with the downlink traffic.

Example 5. The method of example 3, further including performing a CLI measurement using the second Rx resource tuning during a later CLI measurement opportunity that does not conflict with later downlink traffic.

Example 6. The method of any of examples 1-5, in which receiving the downlink traffic using the first Rx resource tuning in response to determining that the time period between the end of the PDCCH traffic and the beginning of the CLI measurement opportunity is less than or equal to the threshold duration includes beginning a measurement of the CLI using the second Rx resource tuning; determining based on decoded PDCCH traffic whether a second time period from the end of the PDCCH traffic to a beginning of the downlink traffic exceeds a second threshold duration; and receiving the downlink traffic using the first Rx resource tuning before completing the measurement of the CLI in response to determining that the second time period from the end of the PDCCH traffic to the beginning of the downlink traffic is less than or equal to the second threshold duration.

Example 7. The method of example 6, further including completing the measurement of the CLI using the second Rx resource tuning in response to determining that the second time period from the end of the PDCCH traffic to the beginning of the downlink traffic exceeds the second threshold duration.

Example 8. A method performed by a processor of a base station for managing downlink traffic reception and cross-link interference, including receiving from a wireless device a capability report indicating whether the wireless device is configured to determine whether a time period between an end of physical downlink control channel (PDCCH) traffic and a beginning of a cross-link interference (CLI) measurement opportunity exceeds a threshold duration; and scheduling for the wireless device downlink traffic that does not overlap with the CLI measurement opportunity in response to determining that the wireless device is not configured to determine whether the time period between the end of the PDCCH traffic and the beginning of the CLI measurement opportunity exceeds the threshold duration.

Example 9. The method of example 8, in which the capability report indicates whether the wireless device is configured to determine whether to switch to the second Rx resource and perform CLI measurement by determining whether a time period between the end of the PDCCH traffic and the beginning of the CLI measurement opportunity exceeds the threshold duration.

Example 10. The method of any of examples 8 and 9, in which the downlink traffic includes physical downlink shared channel (PDSCH) traffic or a channel state information reference signal (CSI-RS).

Example 11. The method of any of examples 8-10, further including scheduling the PDCCH traffic and the CLI measurement opportunity at least the threshold duration apart in response to determining that the wireless device is configured to determine whether the time period between the end of the PDCCH traffic and the CLI measurement opportunity exceeds the threshold duration.

Example 12. The method of any of examples 8-10, in which the capability report indicates whether the wireless device is configured to determine whether a second time period from the end of the PDCCH traffic to a beginning of the downlink traffic is less than or equal to a second threshold duration, the method further including scheduling the downlink traffic at least the second threshold duration after the end of the PDCCH traffic in response to determining that the wireless device is configured to determine whether the second time period from the end of the PDCCH traffic to the beginning of the downlink traffic is less than or equal to the second threshold duration.

Example 13. The method of example 12, further including scheduling downlink traffic so as to not overlap with the CLI measurement opportunity in response to determining that the wireless device is not configured to determine whether the second time period from the end of the PDCCH traffic to the beginning of the downlink traffic is less than or equal to the second threshold duration.

Example 14. The method of example 12, in which the capability report indicates whether the wireless device is configured to abort a CLI measurement in response to determining that a second time period from the end of the PDCCH traffic to the beginning of the downlink traffic is less than or equal to the second threshold duration.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing downlink traffic reception and cross-link interference (CLI), comprising:

receiving from a base station physical downlink control channel (PDCCH) traffic using a first receive (Rx) resource tuning of an Rx resource;

determining whether a time period between an end of the PDCCH traffic and a beginning of a CLI measurement opportunity exceeds a threshold duration for tuning the Rx resource to a second Rx resource tuning; and receiving downlink traffic using the first Rx resource tuning in response to determining that the time period between the end of the PDCCH traffic and the beginning of the CLI measurement opportunity is less than or equal to the threshold duration.

2. The method of claim 1, wherein the downlink traffic includes physical downlink shared channel (PDSCH) traffic or a channel state information reference signal (CSI-RS).

3. The method of claim 1, further comprising:

determining whether the CLI measurement opportunity overlaps with downlink traffic in response to determining that the time period between an end of the PDCCH traffic and the beginning of the CLI measurement opportunity exceeds the threshold duration; and receiving the downlink traffic using the first Rx resource tuning in response to determining that the CLI measurement opportunity overlaps with the downlink traffic.

4. The method of claim 3, further comprising performing a CLI measurement using the second Rx resource tuning during the CLI measurement opportunity in response to determining that the CLI measurement opportunity does not overlap with the downlink traffic.

5. The method of claim 3, further comprising performing a CLI measurement using the second Rx resource tuning during a later CLI measurement opportunity that does not conflict with later downlink traffic.

6. The method of claim 1, wherein receiving the downlink traffic using the first Rx resource tuning in response to determining that the time period between the end of the PDCCH traffic and the beginning of the CLI measurement opportunity is less than or equal to the threshold duration includes:

beginning a measurement of the CLI using the second Rx resource tuning;

determining based on decoded PDCCH traffic whether a second time period from the end of the PDCCH traffic to a beginning of the downlink traffic exceeds a second threshold duration; and receiving the downlink traffic using the first Rx resource tuning before completing the measurement of the CLI in response to determining that the second time period from the end of the PDCCH traffic to the beginning of the downlink traffic is less than or equal to the second threshold duration.

7. The method of claim 6, further comprising:

completing the measurement of the CLI using the second Rx resource tuning in response to determining that the second time period from the end of the PDCCH traffic to the beginning of the downlink traffic exceeds the second threshold duration.

8. A wireless device, comprising:

a processor configured with processor-executable instructions to:

receive from a base station physical downlink control channel (PDCCH) traffic using a first receive (Rx) resource tuning of an Rx resource;

determine whether a time period between an end of the PDCCH traffic and a beginning of a CLI measurement opportunity exceeds a threshold duration for tuning the Rx resource to a second Rx resource tuning; and receive downlink traffic using the first Rx resource tuning in response to determining that the time period between the end of the PDCCH traffic and the beginning of the CLI measurement opportunity is less than or equal to the threshold duration.

9. The wireless device of claim 8, wherein the processor is further configured with processor-executable instructions such that the downlink traffic includes physical downlink shared channel (PDSCH) traffic or a channel state information reference signal (CSI-RS).

10. The wireless device of claim 8, wherein the processor is further configured with processor-executable instructions to:

determine whether the CLI measurement opportunity overlaps with downlink traffic in response to determining that the time period between an end of the PDCCH traffic and the beginning of the next CLI measurement opportunity exceeds the threshold duration; and receive the downlink traffic using the first Rx resource tuning in response to determining that the CLI measurement opportunity overlaps with the downlink traffic.

11. The wireless device of claim 10, wherein the processor is further configured with processor-executable instructions to perform a CLI measurement using the second Rx resource tuning during the CLI measurement opportunity in response to determining that the CLI measurement opportunity does not overlap with the downlink traffic.

12. The wireless device of claim 10, wherein the processor is further configured with processor-executable instructions to perform a CLI measurement using the second Rx resource tuning during a later CLI measurement opportunity that does not conflict with later downlink traffic.

13. The wireless device of claim 8, wherein the processor is further configured with processor-executable instructions to:

begin a measurement of the CLI using the second Rx resource tuning;

determine based on decoded PDCCH traffic whether a second time period from the end of the PDCCH traffic to a beginning of the downlink traffic exceeds a second threshold duration; and receive the downlink traffic using the first Rx resource tuning before completing the measurement of the CLI in response to determining that the second time period from the end of the PDCCH traffic to the beginning of the downlink traffic is less than or equal to the second threshold duration.

14. The wireless device of claim 13, wherein the processor is further configured with processor-executable instructions to complete the measurement of the CLI using the second Rx resource tuning in response to determining that the second time period from the end of the PDCCH traffic to the beginning of the downlink traffic exceeds the second threshold duration.

15. A method performed by a processor of a base station for managing downlink traffic reception and cross-link interference, comprising:

receiving from a wireless device a capability report indicating whether the wireless device is configured to determine whether a time period between an end of physical downlink control channel (PDCCH) traffic and a beginning of a cross-link interference (CLI) measurement opportunity exceeds a threshold duration; and scheduling for the wireless device downlink traffic that does not overlap with the CLI measurement opportunity in response to determining that the wireless device is not configured to determine whether the time period between the end of the PDCCH traffic and the beginning of the CLI measurement opportunity exceeds the threshold duration.

16. The method of claim 15, wherein the capability report indicates whether the wireless device is configured to determine whether to switch to the second Rx resource and perform CLI measurement by determining whether a time period between the end of the PDCCH traffic and the beginning of the CLI measurement opportunity exceeds the threshold duration.

17. The method of claim 15, wherein the downlink traffic includes physical downlink shared channel (PDSCH) traffic or a channel state information reference signal (CSI-RS).

18. The method of claim 15, further comprising:

scheduling the PDCCH traffic and the CLI measurement opportunity at least the threshold duration apart in response to determining that the wireless device is configured to determine whether the time period between the end of the PDCCH traffic and the CLI measurement opportunity exceeds the threshold duration.

19. The method of claim 15, wherein the capability report indicates whether the wireless device is configured to determine whether a second time period from the end of the PDCCH traffic to a beginning of the downlink traffic is less than or equal to a second threshold duration, the method further comprising scheduling the downlink traffic at least the second threshold duration after the end of the PDCCH traffic in response to determining that the wireless device is configured to determine whether the second time period from the end of the PDCCH traffic to the beginning of the downlink traffic is less than or equal to the second threshold duration.

20. The method of claim 19, further comprising scheduling downlink traffic so as to not overlap with the CLI measurement opportunity in response to determining that the wireless device is not configured to determine whether the second time period from the end of the PDCCH traffic to the beginning of the downlink traffic is less than or equal to the second threshold duration.

21. The method of claim 19, wherein the capability report indicates whether the wireless device is configured to abort a CLI measurement in response to determining that a second time period from the end of the PDCCH traffic to the beginning of the downlink traffic is less than or equal to the second threshold duration.

22. A base station, comprising:

a processor configured with processor-executable instructions to:

receive from a wireless device a capability report indicating whether the wireless device is configured to determine whether a time period between an end of physical downlink control channel (PDCCH) traffic and a beginning of a cross-link interference (CLI) measurement opportunity exceeds a threshold duration; and schedule for the wireless device downlink traffic that does not overlap with the CLI measurement opportunity in response to determining that the wireless device is not configured to determine whether the time period between the end of the PDCCH traffic and the CLI measurement opportunity exceeds the threshold duration.

23. The base station of claim 22, wherein the processor is further configured with processor-executable instructions such that the capability report indicates whether the wireless device is configured to determine whether to switch to the second Rx resource and perform CLI measurement by determining whether a time period between the end of the PDCCH traffic and the beginning of the CLI measurement opportunity exceeds the threshold duration.

24. The base station of claim 22, wherein the processor is further configured with processor-executable instructions such that the downlink traffic includes physical downlink shared channel (PDSCH) traffic or a channel state information reference signal (CSI-RS).

25. The base station of claim 22, wherein the processor is further configured with processor-executable instructions to:

schedule the PDCCH traffic and the CLI measurement opportunity at least the threshold duration apart in response to determining that the wireless device is configured to determine whether the time period between the end of the PDCCH traffic and the CLI measurement opportunity exceeds the threshold duration.

26. The base station of claim 22, wherein the capability report indicates whether the wireless device is configured to determine whether a second time period from the end of the PDCCH traffic to a beginning of the downlink traffic is less than or equal to a second threshold duration, and wherein the processor is further configured with processor-executable instructions to schedule the downlink traffic at least the second threshold duration after the end of the PDCCH traffic in response to determining that the wireless device is configured to determine whether the second time period from the end of the PDCCH traffic to the beginning of the downlink traffic is less than or equal to the second threshold duration.

27. The base station of claim 26, wherein the processor is further configured with processor-executable instructions to schedule downlink traffic so as to not overlap with the CLI measurement opportunity in response to determining that the wireless device is not configured to determine whether the second time period from the end of the PDCCH traffic to the beginning of the downlink traffic is less than or equal to the second threshold duration.

28. The base station of claim 26, wherein the processor is further configured with processor-executable instructions such that the capability report indicates whether the wireless device is configured to abort a CLI measurement in response to determining that a second time period from the end of the PDCCH traffic to the beginning of the downlink traffic is less than or equal to the second threshold duration.

* * * * *